(12) United States Patent
Nomura et al.

(10) Patent No.: US 6,323,458 B1
(45) Date of Patent: Nov. 27, 2001

(54) JOINED METAL MEMBER AND METHOD OF JOINING SAID MEMBER

(75) Inventors: Seiji Nomura, Kure; Satoshi Nanba, Higashihiroshima, both of (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 09/277,167

(22) Filed: Mar. 26, 1999

(30) Foreign Application Priority Data

Mar. 31, 1998 (JP) .................................................. 10-105778

(51) Int. Cl.⁷ ...................................................... B23K 11/00
(52) U.S. Cl. ........................ 219/148; 219/162; 219/149; 219/156; 228/194; 228/248
(58) Field of Search .................................... 219/148, 162, 219/149, 156; 228/194, 248

(56) References Cited

U.S. PATENT DOCUMENTS

| | | | |
|---|---|---|---|
| 4,690,320 | * | 9/1987 | Morishita et al. .................... 228/194 |
| 5,904,993 | * | 5/1999 | Takeuchi et al. ..................... 428/627 |

FOREIGN PATENT DOCUMENTS

| | | |
|---|---|---|
| 0 705 960 A2 | 4/1996 | (EP) . |
| 0 723 069 A1 | 7/1996 | (EP) . |
| 58-13481 | 1/1983 | (JP) . |
| 6-58116 | 3/1994 | (JP) . |
| 8-100701 | 4/1996 | (JP) . |
| 8-200148 | 8/1996 | (JP) . |
| 8-270499 | 10/1996 | (JP) . |

\* cited by examiner

*Primary Examiner*—M. Alexandra Elve
(74) *Attorney, Agent, or Firm*—Nixon Peabody LLP; Donald R. Studebaker

(57) ABSTRACT

In order to provide a method of joining a cylinder head 2 and a valve seat 3 by press and heat generated on passing an electrical current through both members 2, 3, to achieve satisfactory joining with minimized heat generated inside when the current is supplied, while eliminating the need for an infiltration step and reduce the production cost, inhibiting an increase in thermal conductivity of the valve seat 3 and improving the wear resistance thereof. The valve seat 3 is made of a sintered material made from a powdery material with a high electrical conductivity element such as Cu dispersed therein. The current and the pressure are applied with a first joining surface 3a of the valve seat 3 and a joining surface 2a of the cylinder head body 2 being put into surface contact with each other in advance.

9 Claims, 43 Drawing Sheets

JOINED METAL MEMBER AND METHOD OF JOINING SAID MEMBER

BACKGROUND OF THE PRESENT INVENTION

1. Field of the Invention

The present invention relates to a joined metal member comprising two metal members joined with each other by press and heat generated on passing an electrical current through the metal members, and a method of joining said member.

2. Prior Art

Various methods are known for joining metal members in such cases as joining a valve seat of an engine cylinder head onto the periphery of an opening of air intake or exhaust port of the cylinder head body.

For example, Japanese Patent Publication JP-A 8-100701 discloses a method of joining a valve seat with an Al-based cylinder head body by brazing using an Al—Zn brazing material and a fluoride flux.

Also such a method is known as disclosed in Japanese Patent Publication JP-A 58-13481, where metal members are joined by resistance welding which utilizes the heat generated by contact resistance between mating surfaces of the two members. With regard to the resistance welding, it has been proposed to increase the amount of heat generated in the mating surfaces by infiltrating pores in a valve seat made of a sintered material with an infiltration metal, thereby decreasing the amount of heat generated inside the sintered material as disclosed in Japanese Patent Publication JP-A 6-58116, or to form a film on the valve seat surface and fuse the film when welding the valve seat with the cylinder head body as disclosed in Japanese Patent Publication JP-A 8-270499.

Further, as disclosed in Japanese Patent Publication JP-A 8-200148, it is proposed to make solid-phase diffusion joining (pressure welding) of the valve seat and the cylinder head body while forming a plastic-deformed layer on the joining surface of the cylinder head body without forming a molten reaction layer When metal members are joined by press and heat generated on passing an electrical current through the metal members as in the resistance welding or solid-phase diffusion joining process, in case the one of the metal members is a sintered metal such as valve seat, it is desired to infiltrate the pores inside of the sintered material with a metal having a high electrical conductivity such as Cu as proposed in Japanese Patent Publication JP-A 6-58116. This makes it possible to lower the bulk resistivity of the sintered material by means of the infiltrating metal and inhibit the heat generation inside the sintered material when passing a current, thereby effectively generating heat in the mating surfaces and achieving better joint.

However, impregnation of an infiltrating metal into the sintered material requires an additional step in the process, which leads to increased production cost. Also, because the infiltrating metal generally increases the thermal conductivity, a valve seat or the like to be used at a high temperature suffers such a problem that the heat dissipation efficiency becomes too high due to the combined effects of both the increased thermal conductivity and the joining effect, thus making it difficult to form an oxide film on the surface, which may lead to poor wear resistance on the valve sheet.

SUMMARY OF THE INVENTION

An object of the present invention provides a method of joining two metal members by pressurizing and heating due to generated heat on passing electrical current through the metal members using a proper sintered material for the first metal member, in order to reduce the production cost by eliminating the infiltration step and, particularly in the case of joining the valve seat to the cylinder head, to improve the wear resistance of a valve seat by inhibiting an increase in thermal conductivity.

In order to achieve the object described above, the present invention employs, as a first metal member, a sintered material made by sintering a powdery material containing particles having high electrical conductivity dispersed therein.

With this scheme, although the first metal member includes pores therein unlike an infiltrated material which is infiltrated with Cu or the like, the first metal member is sintered with the particles having high electrical conductivity dispersed therein beforehand and, therefore, resistivity of the bulk of the first metal member can be maintained at a somewhat high level comparable to that of the infiltrated material. This makes it possible to inhibit the heat generation when passing a current, despite the presence of the pores, and achieve a better joint without the need for infiltrating the material with Cu or the like after sintering.

On the other hand, the thermal conductivity can be kept lower than that of the infiltrated material due to the insulating effect of the pores, and therefore in the case where the first metal member is a valve seat to be used at a high temperature, an oxide film is apt to be formed on the valve sheets while in use because of the heat sink efficiency being maintained at a proper level, then, allowing the wear resistance of the valve surface of the sheet to be improved. Thus it is made possible to reduce the production cost while achieving satisfactory joining and improve the wear resistance of the first metal member when the joined metal member is used at a high temperature.

Particles having high electrical conductivity herein are defined as a substance having an electrical resistivity of not higher than $3\times10^{-8}$ $\Omega$m.

According to the present invention, copper is used as the high electrical conductivity. This makes it possible to effectively decrease the resistivity of the bulk of the first metal member while keeping the production cost low.

In the present invention the first and second metal members previously are located into surface contact with each other before a heat and pressure are applied thereto.

According to this invention, it is made possible to effectively prevent the first metal member from overheating during joining, because the first metal member has a lower thermal conductivity than the infiltrated material.

Generally, in the case of supplying a current and applying a pressure after bringing the base metals into point or linear contact with each other, heat generated in the mating surfaces in the early stage of current flow is concentrated significantly in the vicinity near the contact point or line. As a result, the first metal member is likely to be overheated due to the low thermal conductivity. Moreover, since the first metal member has relatively lower strength due to porosity, the surface to be joined of the first metal member is likely to deform.

However, according to the present invention, the amount of generated heat in the joined surface in surface contact is optimized, and overheat of the first metal member can be prevented despite the low thermal conductivity. Consequently, the pressure can be surely transmitted across the interface of the mating surfaces while preventing the mating surfaces from deforming, and achieve joining more satisfactorily. Area of the surface contact herein may desirably be in a range of 40 to 200 mm$^2$ (more preferably 40 to 100 mm$^2$).

The first metal member preferably may have electrical conductivity higher in the portion thereof on the side opposite to the second metal member than in the portion on the side toward the second metal member.

This scheme makes it possible to control the heat generated in the joined surface to an optimum level while minimizing the heat generated in the first metal member, and make the portion of the first metal member in the vicinity of the joined surface to have a high strength, thus more effectively preventing the first metal member from deforming due to overheat in the joined surface during joining. On the other hand, it is easily to make the first metal member have different values of electrical conductivity in the portion thereof on the side opposite to the second metal member and in the portion on the side nearer to the second metal member. For example, those portions may be made of different materials and temporarily sintered separately, and then put together and subject to final sintering. Thus ease of joining can be improved by a simple process. In case the first metal member is a valve seat or the like, the portion of the first metal member on the side opposite to the second metal member may be set as a portion to be cut in a process that follows the joining, thus making it possible to select the material for the opposite portion without being restricted by the performance and characteristic requirements imposed for the service.

The present invention includes a variation, wherein a joining surface of the first metal member is previously coated with a layer of the brazing material on a diffusion layer formed in the surface. The brazing material is selected from a eutectic alloy comprising a main metal component of the second metal member, which has a lower melting point than both the first and second metal member. Thereafter, the first metal member is joined to the second metal member by press and heat generated on passing an electric current across both the metal members to melt the brazing material to a temperature higher than the melting point of the brazing material, thereby forming another diffusion layer consisting of components of the brazing material and second metal member in the second metal member surface. By pressing the two metal members, the residual molten brazing material is squeezed out of the mating surfaces of the metal members, thus joining the metal members by liquid-phase diffusion due to the diffusion layers.

Thus, since the first and second metal members are joined in the state of liquid-phase diffusion due to the diffusion layers while squeezing out the brazing material, oxide film formed on the surface of the second metal member and contaminants are squeezed together with the brazing material and the diffusion layers are directly joined with each other without interposing the brazing material layer. While a brazing material generally has a low melting point which results in lower heat resistance of the joint, the method of the present invention makes a joint having a higher melting point since alloying of the brazing material with the first metal member changes the composition of the brazing material. Thus the brazing material attains strength and heat resistance which are higher than the original characteristics. The liquid-phase diffusion joining process, having such advantages as described above which cannot be achieved with the prior art, requires it to minimize the heat generation in the material to be joined and melt the brazing material effectively and surely. According to the present invention, however, there occurs no problem since a proper amount of heat can be generated in the mating surfaces without using an infiltrating material. Thus it is made possible to improve the joint strength between the metal members with certainty.

In the present invention, preferably, the first metal member may be of a Fe-based material, and the second metal member may be of an Al-based material, and the brazing material may be of a Zn-based alloy.

Since the Zn brazing material can have a relatively low melting point, the brazing material can be melted to be squeezed out easily and reliably.

Moreover, the Zn-based brazing material can easily form an Fe—Zn diffusion layer by reacting on the Fe-based first metal member, and also can form an Al—Zn diffusion layer by reacting to the Al second metal member. Further, since the joint involves only these two diffusion layers, formation of some brittle inter-metallic compounds based on Fe—Al can be effectively prevented. Thus a combination of materials best suited for the joining process of the present invention can be obtained.

In the present invention the brazing material may preferably be a Zn—Al eutectic alloy. The melting point of the brazing material can be made very low by forming a eutectic alloy of 95% of Zn and 5% of Al by weight. In particular, the brazing material has a higher melting point after joining since the Zn content diffuses into the first and second metal members resulting in a lower Zn content of the brazing material. Also because the Fe—Zn alloy in the diffusion layer of the brazing material with the first metal member and the Al—Zn alloy in the diffusion layer of the brazing material with the second metal member have melting points higher than that of the brazing material before joining, heat resistance of the joined metal members certainly becomes higher than that of the original brazing material. Moreover, forming the eutectic alloy has such advantages as; (1) metals to be joined can be melted in a shorter period of time to reduce the time required for joining since the melting point becomes the lowest possible; (2) stability of the joint can be improved because the eutectic alloy is not formed during the joining process unlike in the prior art; and (3) brittle metal layer is not formed. As a consequence, a particular material for the brazing material which has a low melting point and is easy to handle can be found easily.

In the present invention, the first metal member immersed in a brazing material bath is coated with the brazing material on the surface thereof by using ultrasonic vibration, thereby forming a layer of the brazing material and a diffusion layer of the brazing material to the first metal member in the first metal member.

Since the oxide film and plating layer formed on the surface of the first metal member are broken by the cavitation effect of the ultrasonic wave, the brazing material can be diffused into the first metal member more surely than in the case of employing a mechanical process of rubbing the brazing material against the first metal member. This method also eliminates the need for a subsequent step of removing a flux which is required when brazing using a flux. Thus it is made possible to form the diffusion layer of the brazing material and the first metal member surely by a simple method, and achieve a joined metal member having a high joint strength.

In the present invention, the first and second metal members are joined with each other by causing plastic flow in the surface to be joined of the second metal member.

Since the plastic flow effectively destroys the oxide film formed on the second metal member surface, it is not necessary to protect the surface of the second metal member.

It is also made possible to cause the plastic flow of the second metal member easily by the pressure applied to hold the first and second metal members together, and therefore no special means is required for the plastic flow. In the present inventions, in particular, since the oxide film and contaminants are removed from the surface of the second metal member together with the residually molten brazing material, the brazing material can be surely diffused into the second metal member, thereby forming the diffusion layer of the brazing material and the second metal member surely by a simple method. Thus further improvement can be achieved in the joint strength of the joined metal member.

The present invention can provide a joined metal member comprising a first metal member and a second metal member, which are joined by press and heat generated on passing an electrical current through the metal members.

According to the present invention, the first metal member is a sintered material made of a powdery material containing particles having high electrical dispersed therein. Preferably, such a high electrical conductivity element may be copper.

The first metal member has higher electrical conductivity in the portion thereof on the side opposite to the second metal member than in the portion on the side nearer to the second metal member.

The present invention includes a variation in which the first and second metal members are joined by liquid-phase diffusion through the diffusion layer formed in the surface to be joined of the first metal member, which layer is a eutectic alloy comprising components of the first and second metal members and has a melting point lower than those of the first and second metal members.

In the present invention, preferably, the first metal member may be of an Fe-based material, and the second metal member may be of an Al material and the brazing material is a Zn-based material. The present invention includes a variation, wherein the brazing material is a Zn—Al eutectic alloy.

DESCRIPTION OF THE PREFERRED EMBODIMENTS

Now preferred embodiments of the present invention will be described below with reference to the accompanying drawings.

Embodiment 1

Figure 1:
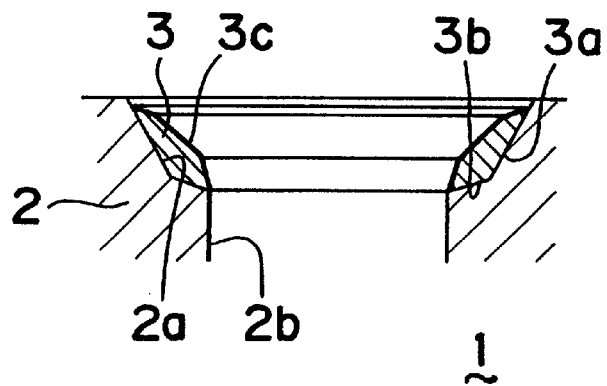
FIG. 1 is a sectional view of the engine cylinder head as the metal member to be joined according to the Embodiment 1 of the present invention.

FIG. 1 shows a portion of a cylinder head 1 of an engine as a joined metal member in the Embodiment 1 of the present invention. The cylinder head 1 comprises a cylinder head body 2 as the second metal member and substantially ring-shaped valve seats 3, 3, . . . (first metal member) joined as described later on the peripheries of openings of four air intake and exhaust ports 2b, 2b, . . . where valves make contact with. The peripheries of the openings 2b are arranged in substantially square configuration when viewed from below the cylinder head 1, and the peripheries of openings are assigned as joining surfaces 2a with the valve seats 3.

An inner circumferential surface of the valve seat 3 serves as a valve contact surface 3c, and is formed in such a taper configuration as the diameter decreases upward along the valve top surface. An outer circumferential surface of the valve seat 3 serves as a first joining surface 3a with the cylinder head body 2, surrounded by the joining surface 2a of the cylinder head body 2 and is formed in a taper configuration similarly to the inner circumferential surface. The top surface of the valve seat 3 serves as a second joining surface 3b with the cylinder head body 2, and is inclined inwardly toward the top.

The valve seat 3 is a sintered material made of a Fe-based material impregnated with a Cu-based material as a high electrical conductivity material infiltrating in the pores thereof. Formed on the first and the second joining surfaces 3a, 3b of the valve seat 3 with the cylinder head body 2 is a diffusion-joined layer 5 (diffusion layer) of the valve seat 3 and the brazing material which is a Zn—Al eutectic alloy (eutectic structure comprising Zn component in about 95% by weight and Al component (component of the cylinder head body 2 to be described later) in about 5% by weight). In other words, the diffusion-joined layer 5 is made of Fe—Zn alloy formed by diffusing Zn component of the brazing material into the valve seat 3.

On the other hand, the cylinder head body 2 is made of an Al-based material, and a molten reaction layer 6 (diffusion layer) of the brazing material and the cylinder head body 2 is formed on the joining surface of the cylinder head body 2 and the valve seat 3. The molten reaction layer 6 is made of Al—Zn formed by liquid-phase diffusion of the Zn component of the brazing material in molten state into cylinder head body 2. The brazing material has a melting point lower than those of the valve seat 3 and the cylinder head body 2.

Figure 2:
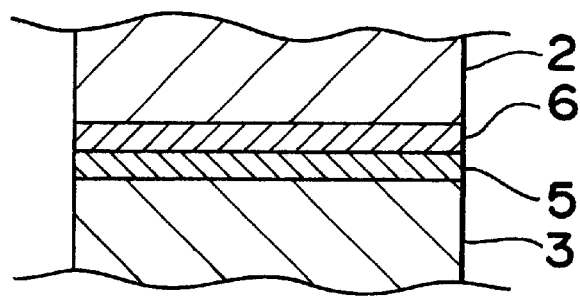
FIG. 2 is a sectional view schematically showing the joined state of the valve seat and the cylinder head body.

The valve seat 3 and the cylinder head body 2 are joined in the state of liquid-phase diffusion via the diffusion-joined layer 5 and the molten reaction layer 6, while the diffusion-joined layer 5 and the molten reaction layer 6 are formed in a total depth of not greater than 1.0 $\mu$m. While a layer 7 of the brazing material is formed between the diffusion-joined layer 5 and the molten reaction layer 6, in FIG. 2, the brazing material layer 7 is extremely thin and substantially negligible.

A method of production the cylinder head 1 having such a configuration as described by joining the valve seats 3 onto the peripheries of the openings (joining surfaces 2a) of the ports 2b of the cylinder head body 2 will be described below (vertical positional relationship of the cylinder head body 2 and the valve seat 3 is reversed in the following description of the production process).

Figure 3:
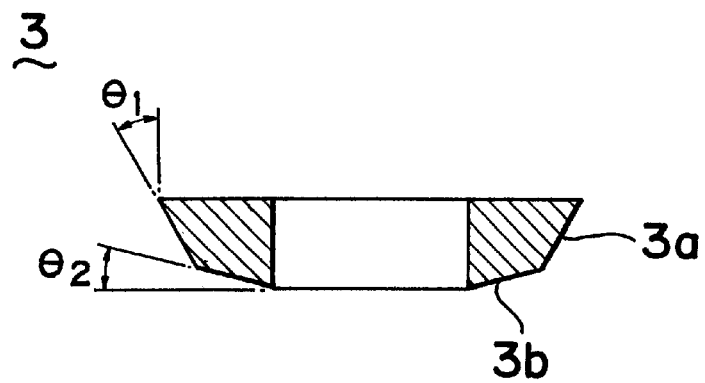
FIG. 3 is a sectional view showing the shape of the valve seat before joining.

First, the valve seat 3 is made by sintering powder of the Fe-based material. At this time, the valve seat 3 formed so that the wall thickness is greater on the inner circumference side and in the top portion (in FIG. 1) so as to withstand the pressure applied when joining the valve seat 3 and the cylinder head body 2. At this stage, the valve contact surface 3c is not formed wile the inner circumferential surface is formed to extend straight upward and the top surface is formed to be substantially horizontal. The first joining surface 3a with respect to the cylinder head body 2 is formed to have a taper angle ($\theta 1$ of FIG. 3) of about 0.52 rad (30°), and the second joining surface 3b is formed to have an inclination angle ($\theta 2$ of FIG. 3) of about 0.26 rad (15°). When the taper angle $\theta 1$ of the first joining surface 3a is too small, it becomes easy to insert the valve seat 3 into the cylinder head body 2 but the action to destroy the oxide film on the joining surface 2a of the cylinder head body 2 becomes lower. When the taper angle $\theta 1$ is too large, on the other hand, it becomes difficult to insert the valve seat 3 into the cylinder head body 2 and outermost diameter of the valve seat 3 becomes too large to bring the two ports 2b, 2b nearer to each other. Thus the taper angle is set to about 0.52 rad (30°).

After making a ring having substantially the same diameter as the valve seat 3 by sintering the Cu-based material powder, the sintered valve seat 3 with the ring placed thereon is put into a heating furnace thereby to infiltrate the Cu-based material into the valve seat 3. Then the valve seat 3 is coated with Cu plating (about 2 $\mu$m thick) over the entire surface thereof including the first and second joining surfaces 3a, 3b for the purpose of preventing oxide film from forming.

Figure 5A:
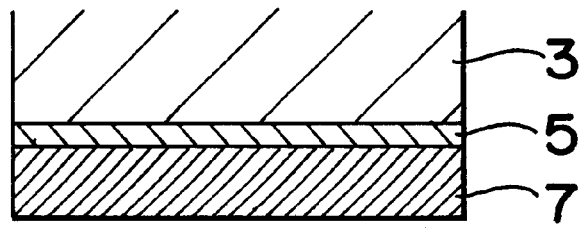
FIGS. 5A–5C are sectional views showing schematically the process of joining the first joining member to the second joining with a braze material.
Figure 5A:
Figure 6:
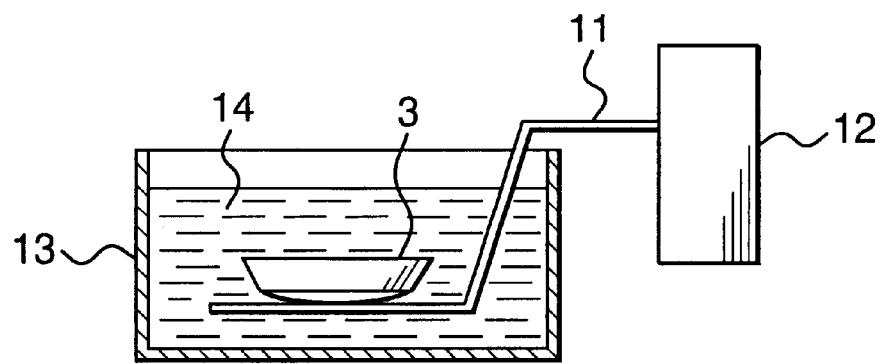
FIG. 6 is a sectional view showing a brazing vessel for coating a valve seat which is immersed in a brazing material bath being coated with the brazing material while applying ultrasonic vibration.

Then as shown schematically in FIG. 5(a), the brazing material layer 7 is formed via the diffusion-joined layer 5 on the first and second joining surfaces 3a, 3b of the valve seat 3. In order to form the brazing material layer 7 and the diffusion-joined layer 5 on the valve seat 3, surface of the valve seat 3 immersed in a brazing material bath is subjected to ultrasonic vibration thereby to coat the surface with the brazing material (ultrasonic plating). Specifically, as shown in FIG. 6, one end of a vibration plate 11 is attached to an ultrasonic oscillator 12 and the valve seat 3 placed on the top surface of the other end of the vibration plate 11 is immersed in the brazing material bath 14 placed in a bottomed vessel 13. When ultrasonic vibration is transmitted from the ultrasonic oscillator 12 via the vibration plate 11 to the valve seat 3 in this condition, the Cu plating layer and the slightly formed oxide film on the surface of the valve seat 3 are destroyed by the cavitation effect of the ultrasonic wave, thus causing the Zn component of the brazing material to be diffused into the valve seat 3 and form the diffusion-joined layer 5 made of Fe—Zn, while the brazing material layer 7 is formed on the front surface of the diffusion-joined layer 5. This process is capable of forming the diffusion-joined layer 5 more easily and surely than with the method of using mechanical friction by rubbing the brazing material against the valve seat 3. Process parameters of the ultrasonic plating may be set to, for example, brazing material bath temperature of 400° C., ultrasonic output power of 400 W and duration of ultrasonic vibration of 20 sec. A molten plating layer similar to the diffusion-joined layer 5 may also be formed on the surface of the valve seat 3 by heating it in a reducing atmosphere.

Figure 4A:
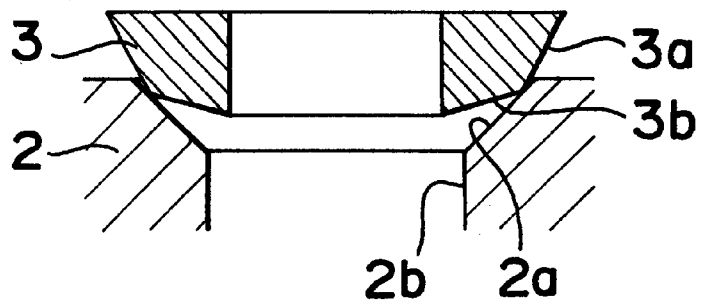
FIGS. 4A–4C are sectional views a valve seat and a cylinder head body showing the procedure of joining the valve seat to the cylinder head body.
Figure 4A:

Then the valve seat 3 is joined to the periphery of the port 2b opening of the cylinder head body 2 which has been made in advance by casting or other process, namely onto the joining surface 2a with the valve seat 3. At this time, the joining surface 2a of the cylinder head body 2 has a taper angle of about 0.79 rad (45°) as shown in FIG. 4(a), unlike the configuration upon completion of joining (same shape as the first and second joining surfaces 3a, 3b of the valve seat 3).

Figure 7:
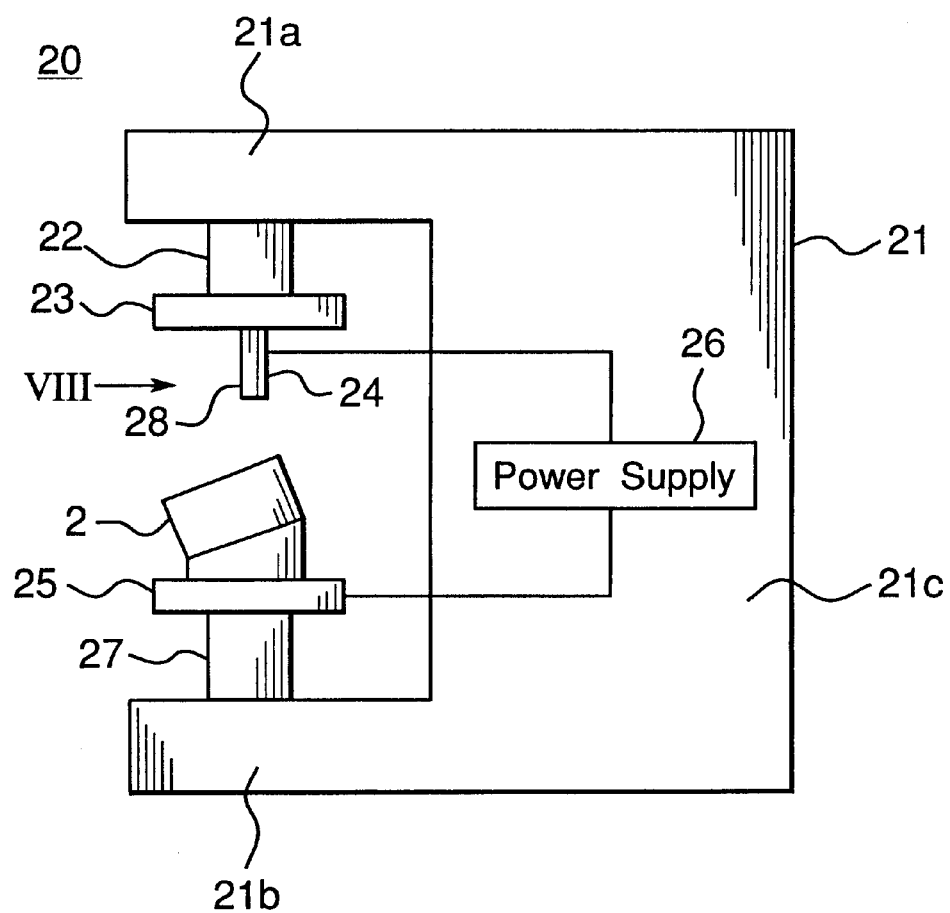
FIG. 7 is a side view of the welding apparatus for joining two metal members according to the present invention.

The valve seat 3 is joined to the joining surface 2a of the cylinder head body 2 by using a welding apparatus 20 which is an improved version of a commercially available projection welder as shown in FIG. 7. The welding apparatus 20 has a substantially C-shaped frame 21 with upper and lower horizontal arms 21a, 21b of the frame 21 being cantilevers supported on only one side thereof by a vertical portion 21c and the other side opposite to the vertical portion 21c being open. A pressure cylinder 22 is disposed below the upper horizontal arm 21a of the frame 21. The pressure cylinder 22 carries on the bottom thereof an upper electrode 24 made of Cu in a substantially cylindrical shape which is mounted on a cylinder rod 23 of the pressure cylinder 22 and can be moved vertically on a common axis with the cylinder rod 23. Provided on the lower horizontal arm 21b is lower electrode 25 made of Cu via a movable base 27 to oppose the upper electrode 24. The lower electrode 25 can carry, on an inclined top surface thereof, the cylinder head body 2 placed thereon with the joining surface 2a facing up. Horizontal position of the movable base 27 with respect to the lower horizontal arm 21b and the top surface of the lower electrode 25 can be adjusted so that center line of the joining surface 2a whereon the valve seat 3 is to be joined is directed in the vertical direction and approximately corresponds to the center line of the upper electrode 24.

Figure 8A:
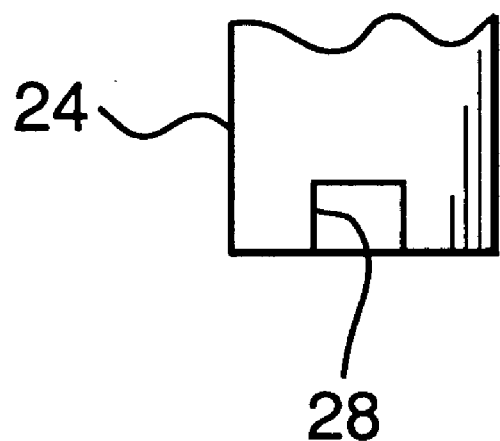
FIG. 8A shows a view of an upper electrode for a projection welding machine in the direction of an arrow of VIII in FIG. 7.
Figure 8B:
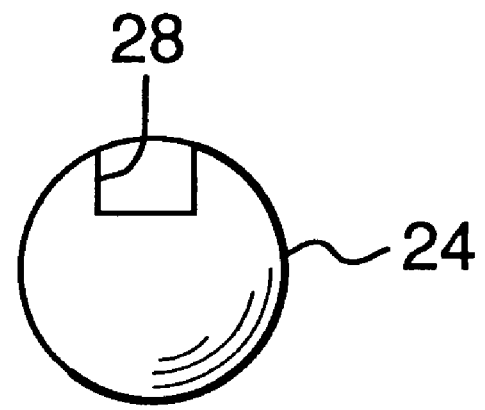
FIG. 8B shows a bottom view of the upper electrode.

The upper and lower electrodes 24, 25 constitute a pair of pressure heads and are connected to a welding power source 26 housed in the vertical portion 21c of the frame 21. When the upper electrode 24 is put into contact with the top surface of the valve seat 3, under such a condition that the valve seat 3 placed on the joining surface 2a of the cylinder head body 2 mounted on the top surface of the lower electrode 25, and the welding power source 26 is turned on while applying a pressure with the pressure cylinder 22 on the valve seat 3 and the cylinder head body 2, current flows through the valve seat 3 to the cylinder head body 2. A notch 28 is formed as a non-conducting portion at the bottom surface of the upper electrode 24 which is to make contact with the top surface of the valve seat 3. The notch is, as shown enlarged in FIGS. 8A and 8B, faces on the opposite side of the vertical portion 21c of the frame 21 (i.e., on the open side of the frame 21).

After placing the cylinder head body 2 on the top surface of the lower electrode 25 of the welding apparatus 20 and adjusting the horizontal position of the movable base 26 and the inclination of the top surface of the lower electrode 24 so that the center line of the joining surface 2a where the valve seat 3 is joined substantially corresponds to the upper electrode 24, the valve seat 3 is placed on the joining surface 2a. At this time, only the corners of the first and second joining surfaces 3a, 3b of the valve seat 3 make contact with the joining surface 2a of the cylinder head body 2, as shown in FIG. 4A. That is, the valve seat 3 and the cylinder head body 2 are in linear contact with each other.

Figure 4B:
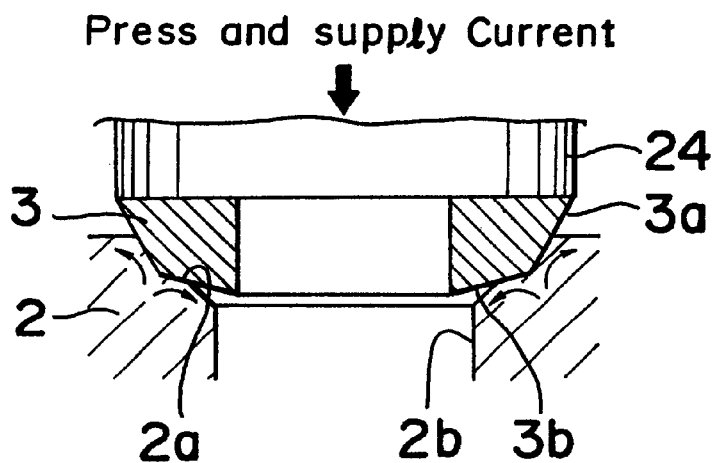
Figure 4B:

Then, as shown in FIG. 4B, the pressure cylinder 22 is actuated to move the upper electrode 24 downward into contact with the top surface of the valve seat 3, and from this state pressurization of the valve seat 3 and the cylinder head body 2 is started. The pressure is preferably about 29429 N (3000 kgf). While maintaining this pressure, the welding power source 26 is turned on in about 1.5 seconds after the beginning of the pressurization, to heat the brazing material layer 7 to a temperature above the melting point of the brazing material by resistive heating with an electric current. The current is preferably about 70 kA.

Figure 5B:
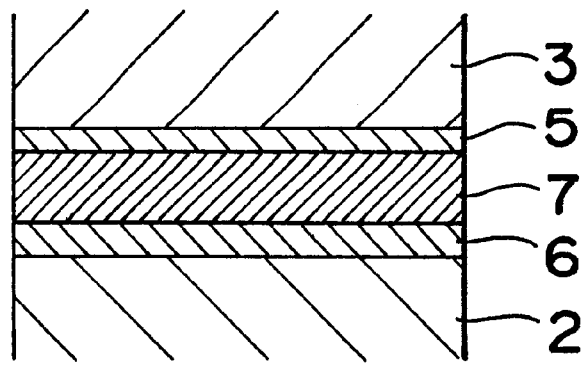
Figure 5B:
Figure 5C:
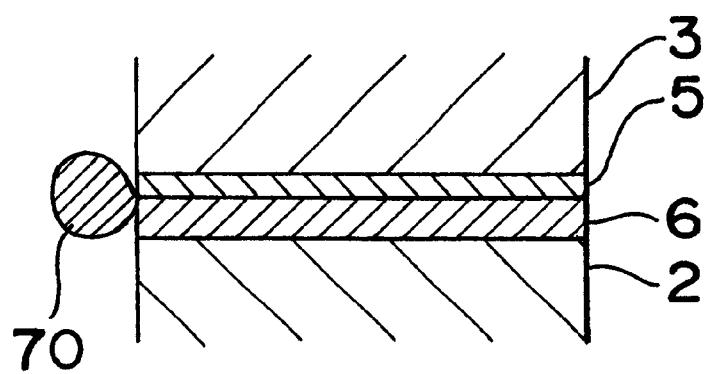
Figure 11:
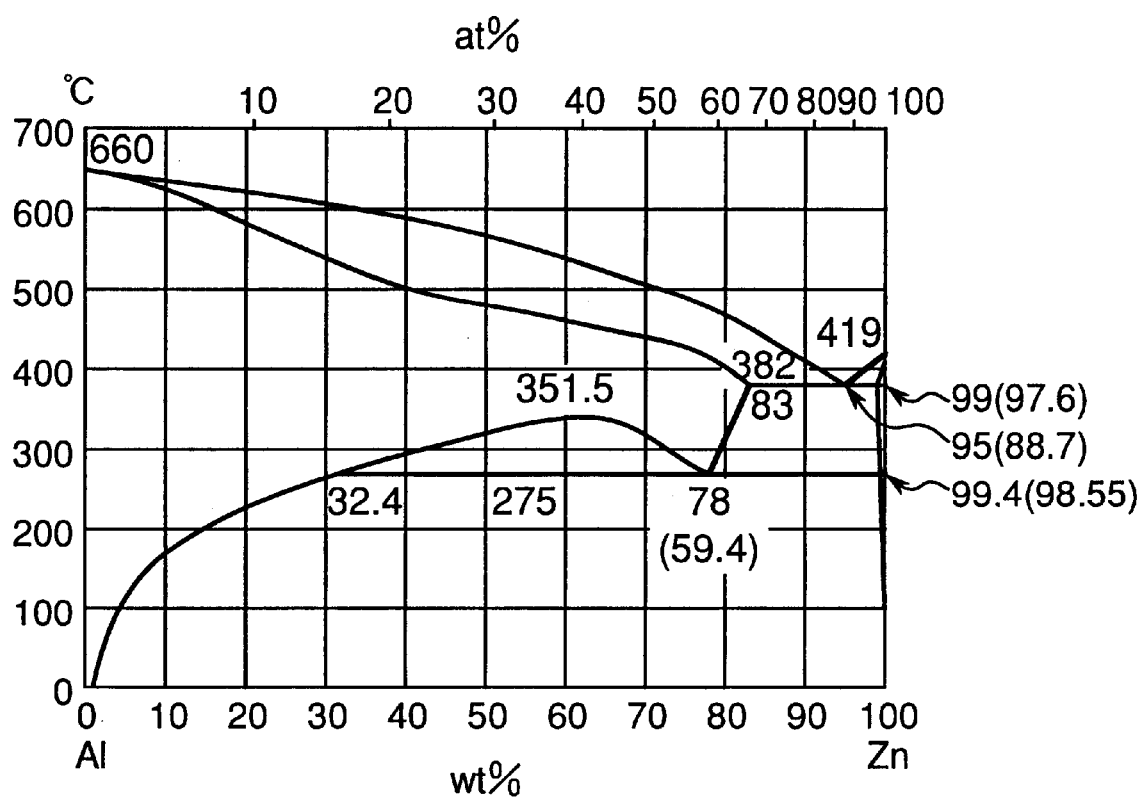
FIG. 11 is a equilibrium phase diagram of Al—Zn binary system alloy.

The brazing material which is a eutectic alloy comprising about 95% of Zn and about 5% of Al by weight has a melting point as low as about 380° C. as shown in FIG. 11, and melts immediately upon passing the current. The resistive heating softens the joining surface 2a of the cylinder head body 2 so that the corners of the first joining surface 3a and the second joining surfaces 3b of the valve seat 3 lodge into the joining surface 2a of the cylinder head body 2 through plastic flow thereof, thereby causing the valve seat 3 to settle in the cylinder head body 2. In this process, the oxide film on the joining surface 2a of the cylinder head body 2 is surely destroyed while the Zn component of the molten brazing material diffuses in liquid phase into the cylinder head body 2 to form the molten reaction layer 6 made of Al—Zn (see FIG. 5B).

At the same time, almost all of the brazing material in the brazing material layer 7 is squeezed out by pressurizing the first joining surface 3a and the second joining surfaces 3b of the valve seat 3 and the joining surface 2a of the cylinder head body 2, to be discharged with the oxide film and contaminants. As a consequence, the diffusion-joined layer 5 and the molten reaction layer 6 are directly joined without the brazing material layer 7 interposed therebetween, with the diffusion between the two layers 5, 6 being accelerated. Moreover, having the layers 5, 6, interposed makes it possible to prevent brittle intermetallic compound of Fe—Al from forming. Thus the valve seat 3 and the cylinder head body 2 are joined in liquid phase diffusion state with the diffusion-joined layer 5 and the molten reaction layer 6 interposed therebetween, with a very high joint strength. Proportion of Zn content in the brazing material decreases due to diffusion resulting in increase of the melting point to 500° C. or higher (refer to FIG. 11). As a result, heat resistance higher than that of the original brazing material can be attained after joining.

In addition, since the Cu-based material of high electrical conductivity infiltrating the valve seat 3 fills the pores generated during sintering process, no part of the pressure is consumed in crushing the pores. Thus all the pressure is effectively used in causing the plastic flow of the joining surface 2a of the cylinder head body 2 and squeezing out the brazing material, while preventing heat generation in the valve seat 3 when passing a current and effectively melting the brazing material.

Since the upper and lower horizontal arms 21a, 21b of the frame 21 are made in cantilever configuration, wherein the pressure becomes lower on the opening side of the frame 21 due to flexure of the upper and lower horizontal arms 21a, 21b and accordingly contact resistance of the portion of the joining surfaces 2a, 3a, 3b corresponding to the opening of the frame 21 becomes higher, resulting in excessive heat generated in the opening which may lead to localized melting of the cylinder head body 2 thus generating a gap from the valve seat 3. This may be prevented by forming the notches 28 in the bottom surface of the upper electrode 24 on the opening side of the frame 21. In this case, less current flows in the portion of the valve seat 3 and the cylinder head body 2 corresponding to the opening of the frame 21. Consequently, such a trouble does not occur as the portion of the cylinder head body 2 corresponding to the opening of the frame 2 experiences localized melting thus generating a gap from the valve seat 3. Also because the center lines of the cylinder rod 23 of the pressure cylinder 22 and the upper electrode 24 correspond, to each other, pressure varies less over the upper electrode 24 and the upper electrode 24 experiences less positional difference in the horizontal direction with smaller notch 28 being required than a machine with the cylinder rod 23 and the upper electrode 24 having center lines not corresponding to each other. It is also made possible to prevent the center of the valve seat 3 from being displaced with respect to the joining surface 2a of the cylinder head body 2. The notch 28 may also be replaced by an insulating member attached to the lower surface of the upper electrode 24 which prevents local melting of the cylinder head body 2 from occurring.

Figure 4C:
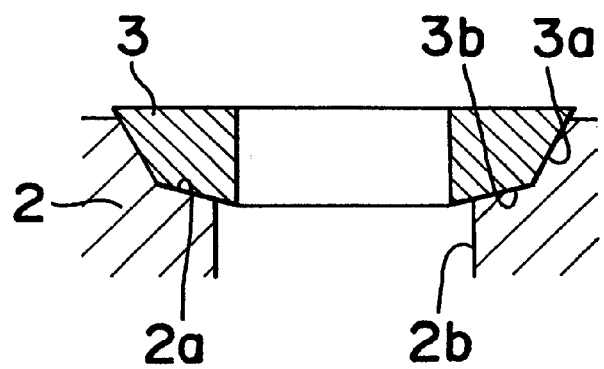
Figure 9:
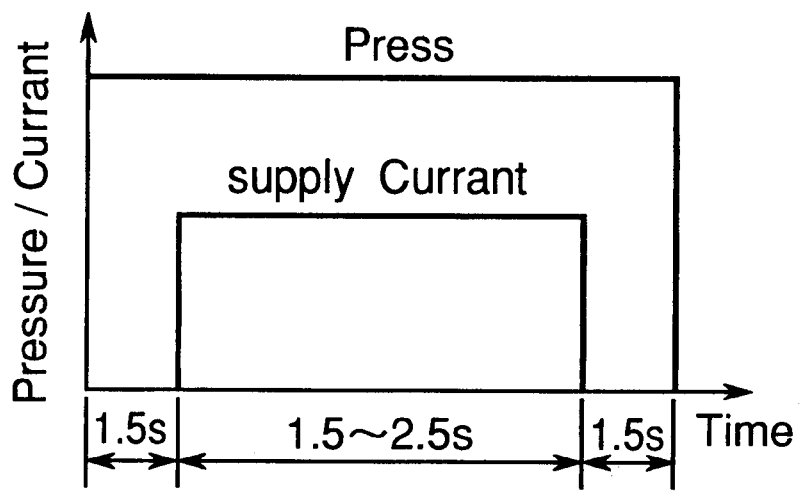
FIG. 9 is a time chart showing a change of a pressure and current to be supplied to the two joining metal members in a joining process in the joining method of the present invention.

By the time the welding power source 26 is turned off to shut down the current in 1.5 to 2.5 seconds after the beginning of passing the current, the valve seat 3 is completely embedded in the joining surface 2a of the cylinder head body 2 (refer to FIG. 4C). The pressure is left to remain acting even after cutting the current as shown in FIG. 9. The pressure is maintained until the molten reaction layer 6 almost completely cools down and solidify, then preventing separation or cracks in the joining surfaces 2a, 3a, 3b due to different efficient of heat expansion between the valve seat 3 and the cylinder head body 2.

Figure 10:
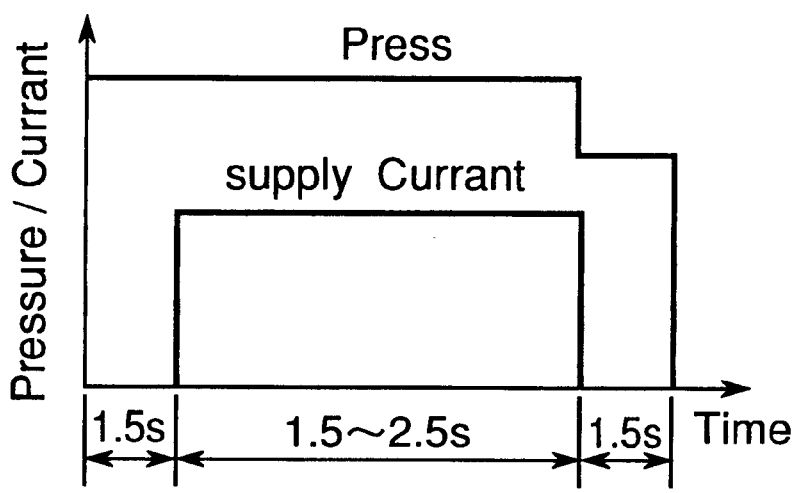
FIG. 10 is a time chart, similar to FIG. 9, showing another example of controlling a pressure and current in the joining process for the joining method of the present invention.

It is preferable that the pressure be decreased substantially at the same time the current is shut down, as shown in FIG. 10. Since a high pressure increases possibility of developing cracks in the joining surfaces 2a, 3a, 3b immediately after solidification as deformation capability of the Joined interfaces decreases, the pressure may be decreased to such a degree that accommodates shrink deformation, thereby surely preventing cracking in the joining surfaces 2a, 3a, 3b due to large stress after solidification.

In about 1.5 seconds after shutting down the current, the pressure is removed, thereby, completing the joining of the valve seat 3 and the cylinder head body 2. The same process is repeated to join other valve seats 3 on the remaining joining surfaces 2a of the cylinder head body 2.

Last, inner circumferential surface and the top surface of each valve seat 3 are machined into specified shape required to form the valve contact surface 3c. This completes the cylinder head 1 having the valve seats 3 joined on the peripheries of the port 2b openings of the cylinder head body 2.

Therefore, according to Embodiment 1, since the valve seat 3 and the cylinder head body 2 are joined in liquid phase diffusion state with the diffusion-joined layer 5 and the molten reaction layer 6 interposed therebetween by means of heat generated by electric current and pressure, the cylinder head with a very high joint strength and heat resistance higher than that of the original brazing material can be manufactured in a shorter period of time. Also since setting of only the pressure and the current amplitude to such values that enable it to melt and discharge the brazing material, high joint strength can be achieved in a wide range of operating parameters. Moreover, this process makes it possible to make the valve seat 3 far smaller that is possible with the shrink fit joining process, and therefore distance between the ports 2b, 2b can be reduced or the throat diameter can be increased. Further, since thermal conductivity in the vicinity of the valve can be improved with no heat insulation layer being generated and a cooling water passage provided between the ports 2b, 2b can be brought nearer to the valve seat, temperature in the vicinity of the valve can be decreased effectively. In addition, even when a glow plug or an injector is installed between the ports 2b, 2b, sufficient wall thickness can be ensured in between. As a result, engine performance, reliability and degree of freedom in the design can be improved.

While the valve seat 3 is made by sintering and then infiltrated with Cu-based material in Embodiment 1, infiltration may not be necessary as far as the valve seat 3 has a certain level of density. In case the valve seat 3 is made of forge sintering which is obtained by forging a sintered body, pores in the valve seat 3 can be eliminated as in the case of infiltration, and therefore the brazing material can be discharged effectively.

While a current is passed between the valve seat 3 and the cylinder head body 2 to heat the brazing material layer 7 to a temperature higher than the melting point of the brazing material by resistive heating thereby melting the brazing material in Embodiment 1, the brazing material may also be melted by local heating through induction heating or the like.

Embodiment 2

Figure 12:
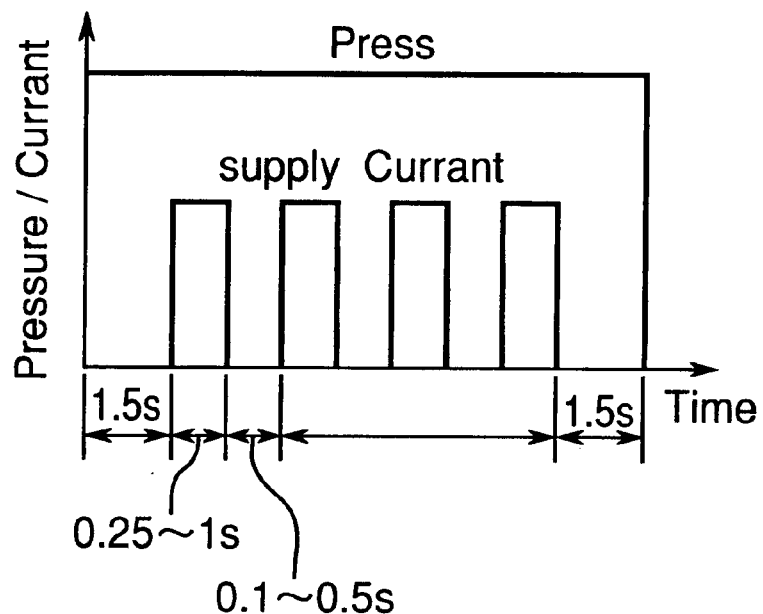
FIG. 12 is a time chart, similar to FIG. 9, showing another aspect of controlling a pressure and pulsed current.

FIG. 12 shows a chart of current-pressure control in Embodiment 2 of the present invention, wherein current control method when joining the valve seat 3 and the cylinder head body 2 is different from that in Embodiment 1.

In this embodiment, instead of passing a constant current continuously, current pulses of large and small amplitudes are repetitively supplied. The higher amplitude is set to a constant level of about 70 kA and the lower level is set to zero. Duration of the pulse is 0.25 to 1 second, with an interval between pulses being 0.1 to 0.5 seconds. 3 to 9 pulses are preferably supplied (4 pulses are shown in FIG. 12). The period from the beginning of application of pressure to the beginning of supplying the first current pulse and the period from the end of the last pulse to the termination of application of pressure are 1.5 seconds, which are the same as in Embodiment 1.

Figure 13:
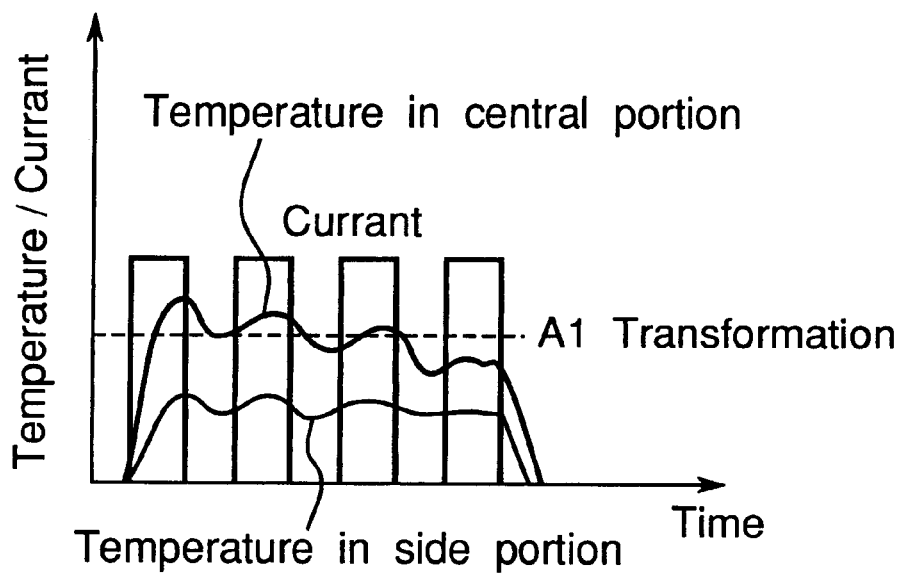
FIG. 13 a time chart showing a change in a pressure and pulsed current to be supplied to the two joining metal members and in temperatures in the members, in a joining process in the joining method of the present invention.

A change in temperature of the valve seat 3 when supplying pulsed current are shown in FIG. 13. Since the valve seat 3 made of an Fe-based material has a fairly low heat capacity, the valve seat 3 is subjected to a rapid increase in temperature due to resistive heating. Particularly in the central portion in the vertical direction, it is more difficult to dissipate heat than it is in the upper and lower portions where heat is easily dissipated to the upper electrode 24 and the cylinder head body 2, and the contact resistance between the valve seat 3 and the cylinder head body 2 is high, and therefore the amount of resistive heating is larger and temperature of the central portion of the valve seat 3 in the vertical direction reaches beyond the transformation point of Al after the first pulse is turned off. As the valve seat 3 is almost completely embedded in the cylinder head body 2 at this time, the current may be completely shut down. However, this causes the valve seat 3 to be cooled down rapidly from the temperature above the transformation point to cause hardening of the central portion in the vertical direction, thus resulting in increased hardness.

Therefore, second pulse is supplied when the temperature lowers slightly. At this time, unlike in the period of the first pulse, contact resistance decreases due to metallurgical junction resulting in less resistive heat generation while the heat is being dissipated. Thus the same amplitude of current as the first pulse does not cause as much temperature rise. As this is repeated, the temperature gradually lowers and therefore hardness of the valve seat 3 hardly increases.

According to Embodiment 1, since the central portion of the valve seat 3 in the vertical direction is gradually decreased by supplying pulsed current, hardness of the valve seat 3 does not significantly increase, thus preventing the inner circumferential surface from becoming hard to machine. Also the valve contact surface 3c is effectively prevented from becoming too hard and increasing the possibility of the valve to wear.

Figure 14A:
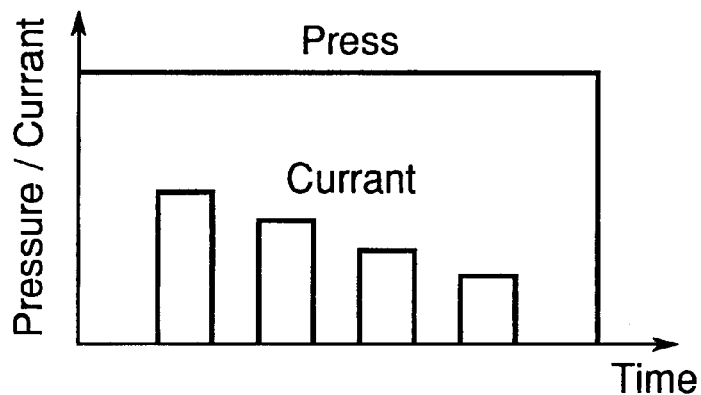
FIGS. 14A–14C show time charts of three type of current controls with a pressure in the joining process for the joining method of the present invention.
Figure 14B:
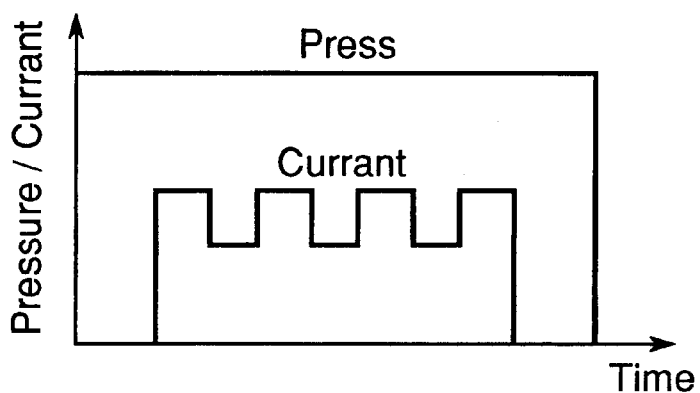
Figure 14C:
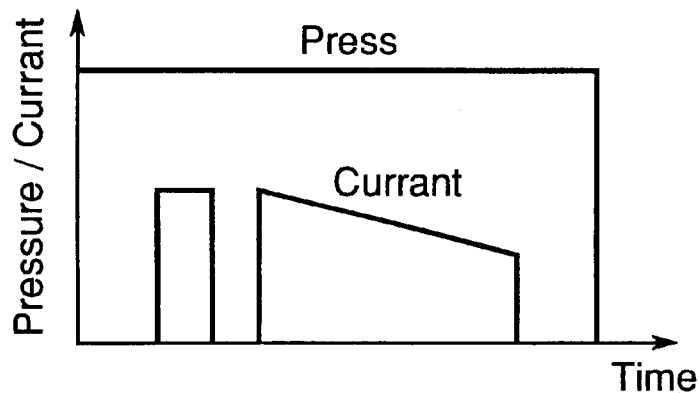

Although the pulses of current of constant amplitude interposed by interval of zero current are supplied in Embodiment 1, the present invention is not limited to this scheme. For example, as shown in FIG. 14A, the amplitude of the pulse current may be decreased stepwise or, as shown in FIG. 14B, high pulses and low pulses may be used. Or alternatively, as shown in FIG. 14C, first high current pulse and low current pulse may be followed by continuous supply of current with the amplitude decreasing with time. In other words, the first pulse may be followed by any form of current supply as far as the temperature of the valve seat 3 can be gradually decreased.

Figure 15:
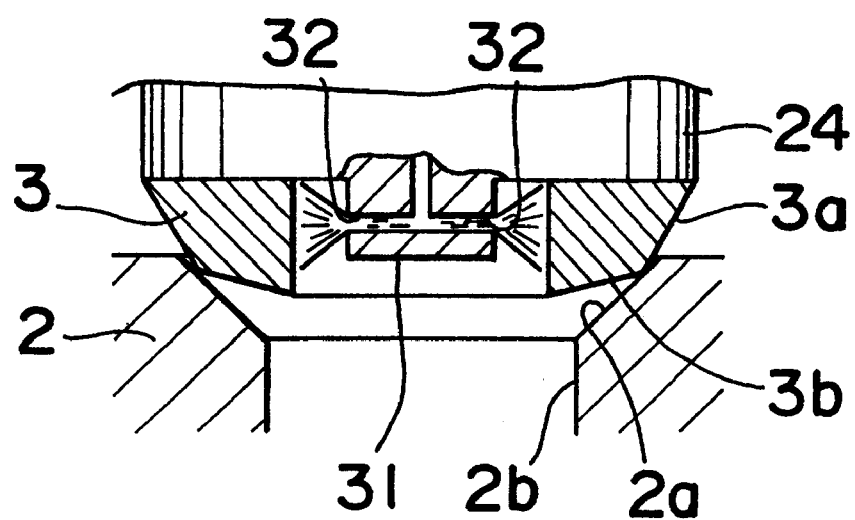
FIG. 15 is a sectional view of an upper electrode in contact to the two joining metal members in a projection welding machine, showing the state of spraying cooling water onto the inside surface of the valve seat.

In order to improve the heat dissipation from the valve seat 3 to the upper electrode 24, cooling water is preferably passed through the upper electrode 24 for water cooling thereof. Or otherwise, as shown in FIG. 15, a cylindrical projection 31 may be provided below the upper electrode to oppose the inner surface of the valve seat 3 thereby to spray cooling water onto the inner surface of the valve seat 3 from inside the upper electrode 24 through a plurality of nozzles 32 and 32 arranged at equal intervals around the projection 31. This configuration makes it possible to effectively cool the central portion of the valve seat 3 in the vertical direction thereby preventing the valve seat 3 from being over heated beyond the transformation point of Al.

Embodiment 3

Figure 16:
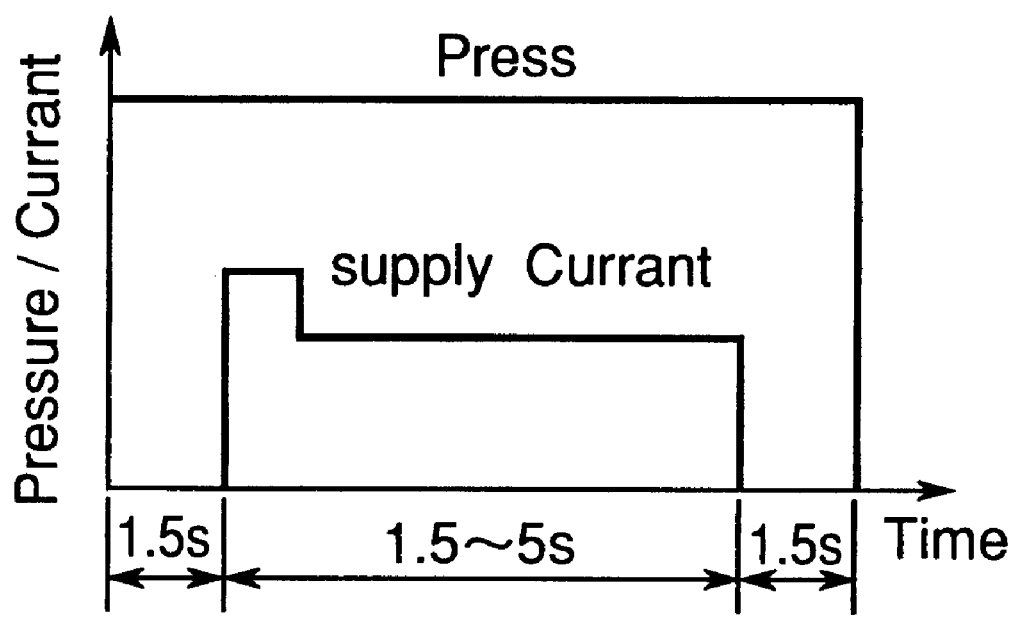
FIG. 16 is a time chart, similar to FIG. 9, showing another aspect of controlling a pressure and current in the joining process for the joining method of the present invention.

In FIG. 16, in Embodiment 3 of the present invention, current control method when joining the valve seat 3 and the cylinder head body 2 is different from that of Embodiments 1 and 2. In this embodiment, the welding apparatus 20 has a limit switch (not shown) as valve seat detecting means which senses the vertical position of the valve seat 3, while the limit switch is activated when the valve seat 3 is almost completely embedded in the cylinder head body 2. When the limit switch actuates after the supply of current has started, the current is decreased to a level lower than the initial current (approximately 70 kA). Shut-down of the decreased current is controlled by the time. That is, the current is shut down in 1.5 to 5 seconds after the beginning of supplying the initial current.

Joining process with such a current control as the current is decreased when the valve seat 3 is almost completely embedded in the cylinder head body 2 will be described below.

At the beginning of supplying current, since the temperature of the valve seat 3 rises far rapidly than the cylinder head body 2 which is made of Al, as described in conjunction with Embodiment 2, the valve seat 3 experiences greater thermal expansion than the cylinder head body 2 despite the heat expansion coefficient being lower that that of the cylinder head body 2. Consequently, in case the current is shut down completely when the valve seat 3 is almost completely embedded in the cylinder head body 2, the valve seat 3 is subjected to tensile thermal stress because the valve seat 3 experiences greater shrinkage than the cylinder head body 2.

Therefore, current supplied is decreased from the initial current, so that the temperature of the valve seat 3 gradually lowers similarly to the case of Embodiment 2. On the other hand, since the temperature of the cylinder head body 2 rises due to the heat transmitted from the valve seat 3, difference in temperature between the valve seat 3 and the cylinder head body 2 decreases. Thus when the current is shut down, the difference in shrinkage decreases thereby decreasing the thermal stress generated in the valve seat 3.

According to Embodiment 3, since the current is decreased from the initial current when the valve seat 3 is almost completely embedded in the cylinder head body 2, difference in the amount of thermal expansion (shrinkage) between the valve seat 3 and the cylinder head body 2 due to the difference in thermal capacity and heat expansion coefficient can be decreased. Thus it is made possible to decrease the tensile thermal stress generated in the valve seat 3 and prevent vertical cracks from developing in the inner circumferential surface.

Figure 17A:
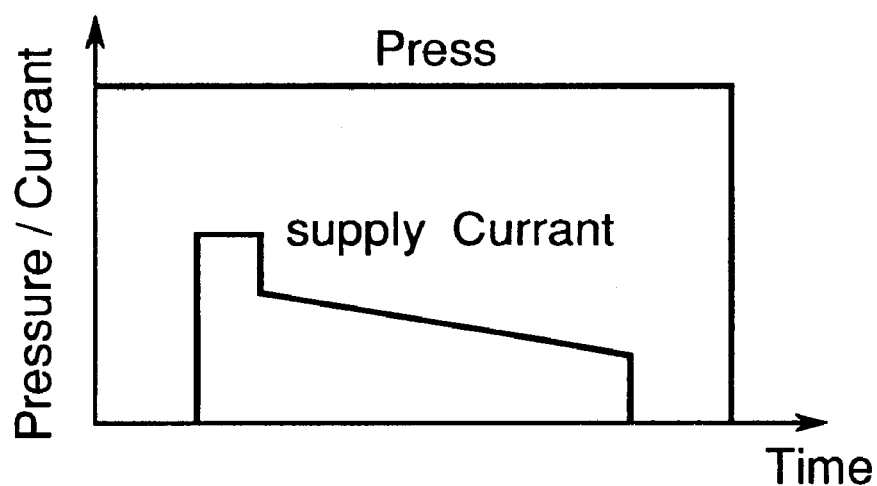
FIGS. 17A and 17B show time charts of two type of current controls with a pressure in the joining process for the joining method of the present invention.
Figure 17B:
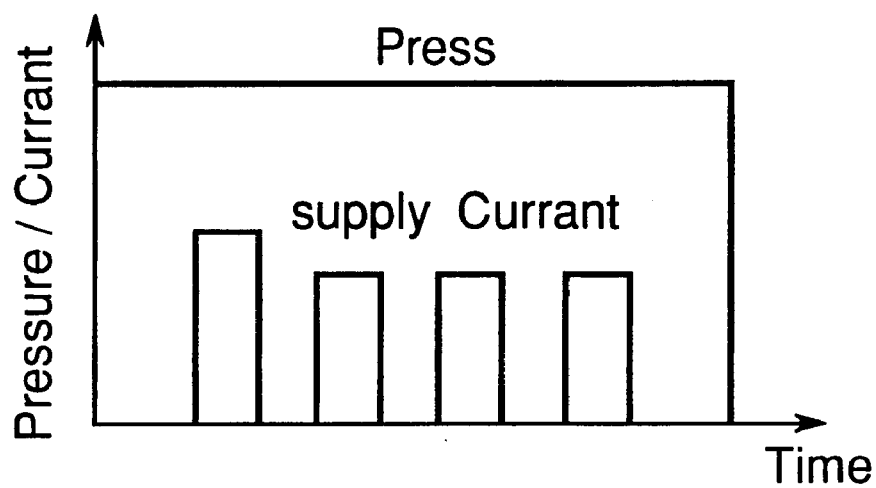

Although the current of constant amplitude is supplied after activation of the limit switch in Embodiment 3, the present invention is not limited to this scheme. For example, as shown in FIG. 17A, the initial current of large amplitude may be followed by supply of current with the amplitude decreasing with time or, as shown in FIG. 17B, pulses of current lower than the initial current maybe supplied after the limit switch is activated, similarly to Embodiment 2. The same method of current control as that of Embodiment 2 can achieve similar effects.

Although the current amplitude is changed by sensing the height of the valve seat 3 with the limit switch in Embodiment 3, position sensing means such as photo-sensor may also be used. Also instead of sensing the position, current may also be changed according to the lapse of time. In the last case, current is preferably changed in 0.25 to 1 second (more preferably 0.25 to 0.5 seconds) after the beginning of supplying the current. This period allows it to change the current when the valve seat 3 is almost completely embedded in the cylinder head body 2.

Further it is preferable that the cylinder head body 2 be preheated to about 200° C. before joining the valve seat 3 to the cylinder head body 2. This procedure decreases the temperature difference further and makes it possible to minimize the thermal stress. As a result, vertical crack can be surely prevented from developing in the valve seat 3, and the need to change the current after the limit switch is activated can be eliminated. Preheating of the cylinder head body 2 can be done by means of the welding apparatus 20. Specifically, with the upper and lower electrodes 24, 25 of the welding apparatus 20 being replaced with ones made of carbon, and the cylinder head body 2 being held between the electrodes 24, 25, the welding power source is turned on, thereby preheating the cylinder head body 2. Since the electrodes 24, 25 are made of carbon, much heat is generated by the electrodes thus preheating the cylinder head body 2 efficiently. This scheme makes in-line operation possible.

Figure 18:
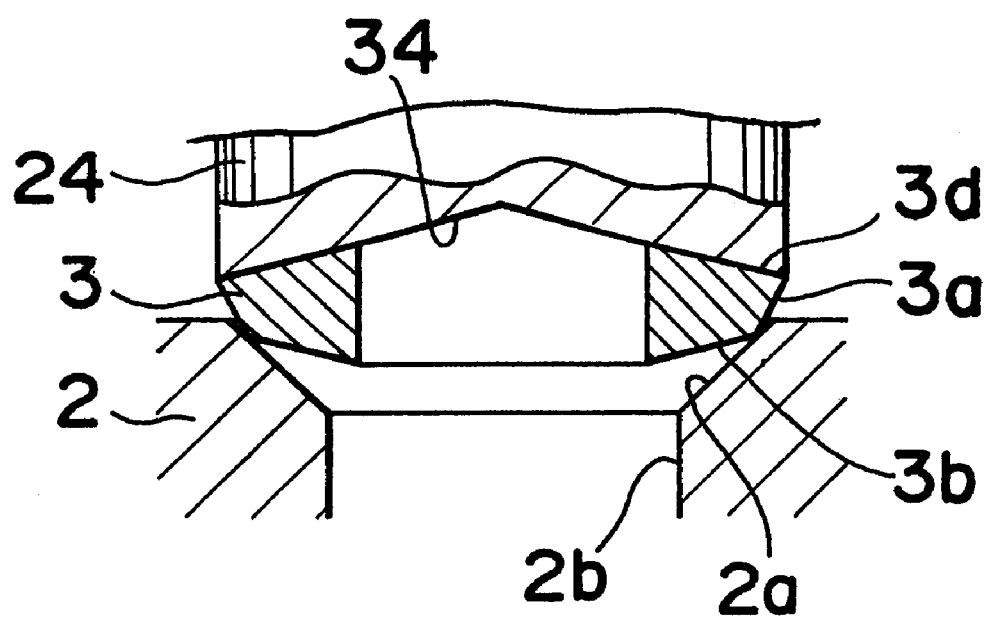
FIG. 18 is a sectional view of an upper electrode in contact to the two joining metal members in a projection welding machine, showing a state of applying a pressure also in the direction of decreasing diameter of a valve sheet as a first metal member.

Such a method may also be employed as shown in FIG. 18, where the top surface of the valve seat 3 is higher toward the center to form the tapered top surface 3d, and a conical recess 34 is formed on the bottom surface of the upper electrode 24 where the tapered top surface 3d of the valve seat 3 can be substantially fitted, while the pressure is applied with the tapered top surface 3d of the valve seat 3 being fitted in the recess 34 of the upper electrode 24. When the pressure is applied under this condition, the pressure acts also in the direction of decreased radius of the valve seat 3, and therefore expansion of the valve seat 3 can be prevented even when the temperature thereof rises, thus minimizing the difference in the amount of shrinkage despite a significant difference in the temperature between the valve seat 3 and the cylinder head body 2. Thus this method is also capable of preventing vertical from developing in the valve seat 3.

Figure 19:
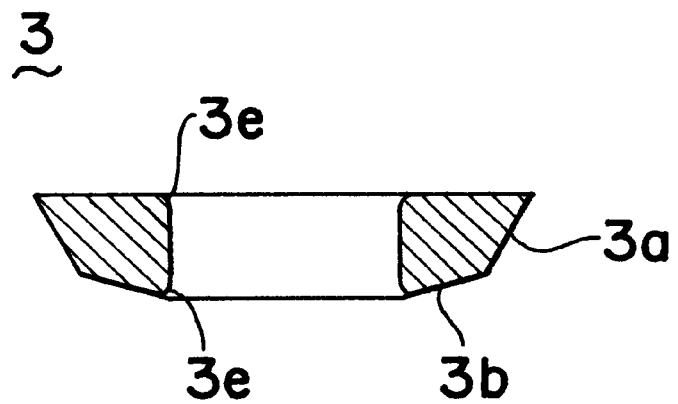
FIG. 19 is a sectional view, similar to FIG. 3, showing a valve sheet for another example of the present invention.

As shown in FIG. 19, it is preferable to form chamfered portions 3e, 3e on the corners between the inner circumferential surface and the lower and upper surfaces, in order to mitigate stress concentration on 5 the inner circumferential surface of the valve seat 3.

Also because the inner circumferential surface side of the valve seat 3 is to be machined off at the last, the valve seat 3 may be sintered with the portion to be machined off made of en inexpensive material.

Embodiment 4

Figure 20:
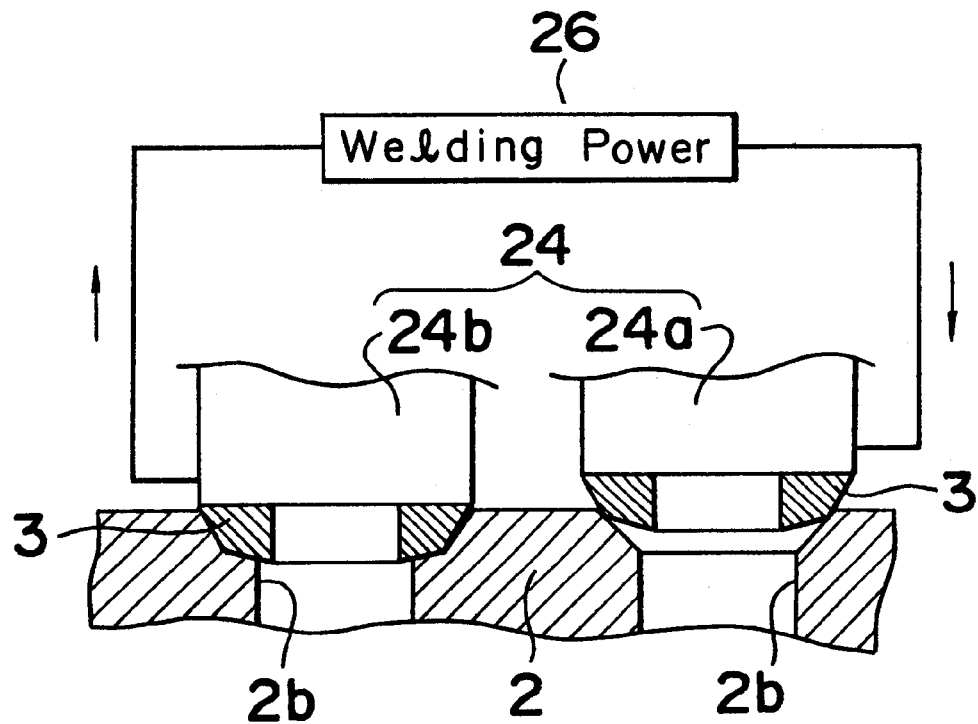
FIG. 20 is a view showing two electrodes pressing the corresponding valve seals onto the cylinder head and a electric series circuit to be applied to the two electrodes in joining by a welding machine.

FIG. 20 shows a portion of the welding apparatus 20 according to Embodiment 4 of the present invention (detailed description of portions identical with those as shown in FIG. 7 will be omitted and different portions will only be described), wherein a path of passing the current is changed from those of Embodiments 1 to 3.

In this embodiment, while the welding apparatus 20 20 has the lower electrode 25 similarly to Embodiments 1 to 3, the lower electrode 25 is not connected to the welding power source 26 and is used only for the purpose of applying pressure to the valve seat 3 and the cylinder head body 2. The upper electrode 24 comprises 25 first and second electrodes 24a, 24b, the first electrode 24a being the same as that of Embodiments 1 to 3. The second electrode 24b can be moved vertically by a pressure cylinder which is similar to but separate from the pressure cylinder 22 that moves the first electrode 24a vertically. The second electrode 24b is made of carbon, unlike the first electrode 24a, and the electrodes 24a, 24b are connected to the welding power source 26.

The first and second electrodes 24a, 24b are arranged to make contact with the top surfaces of the valve seat 3 which is yet to be joined and the valve seat 3 which has been already joined of the cylinder head body 2, respectively. When the welding power source 26 is turned on, current passes through the first electrode 24a, the valve seat 3 yet to be joined, the cylinder head body 2, the valve seat 3 which has been joined and the second electrode 24b, in this order, before returning to the welding power source 26. In this configuration, the valve seat 3 which has been joined serves as the return path for the current during joining of the valve seat 3 yet to be joined.

According to Embodiment 4, the amount of resistive heating in the valve seat 3 which has been joined is small and the temperature does not rise as in the valve seat 3 yet to be joined when joining the valve seat 3. However, since the second electrode 24b made of carbon generates heat, even the valve seat 3 which has been joined is hardened to have higher hardness, it can be tempered as described in conjunction with Embodiment 2. Moreover, the valve seat 3 which has been joined can be tempered without increasing the number of processes in line. As a consequence, thermal effect of increased hardness of the valve seat 3 can be effectively mitigated during joining.

Although the second electrode 24b is made of carbon in Embodiment 4, when temperature of the valve seat 3 which has been joined rises too high as carbon is a material capable of generating heat most, material of the second electrode 24b may be selected from those that allow effective tempering such as steel and brass.

Embodiment 5

Figure 21:
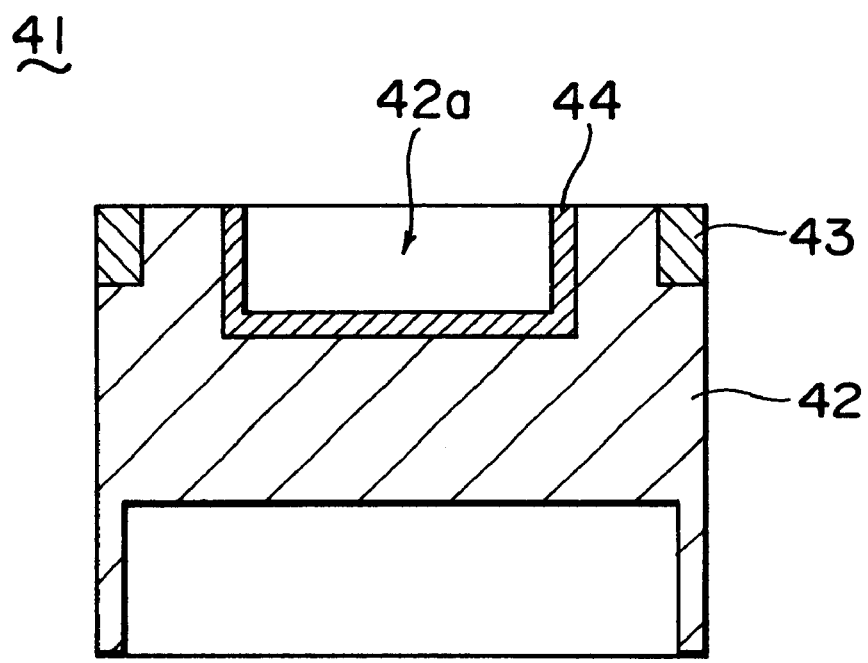
FIG. 21 is a sectional view of an engine piston as the metal member to be joined according to another aspect.

FIG. 21 shows a piston of a diesel engine as a joined metal member according to Embodiment 5 of the present invention. The piston 41 comprises, as in Embodiment 1, a piston body 42 (second metal member) made of an Al-based material with a ring insert 43 (first metal member) made of an Fe-based material joined on the periphery of upper portion thereof and a reinforcement member 44 (first metal member) made of an Fe-based material (for example, austenite stainless steel) joined on a lip in a combustion chamber 42a provided in provided at the center in the upper portion of the piston body 42.

While the piston body 42 is cast with an insert of the ring insert 43 in the prior art. The strength of the piston body 42 cannot be improved by a T6 heat treatment because casting the piston body 42 together with the ring insert 43 accompanies the generation of a brittle intermetallic compound of Fe—Al. According to this embodiment, on the other hand, the piston body 42 is subjected to the T6 heat treatment then the ring insert 43 can be joined to the piston body 42. Even when the T6 heat treatment is applied after joining the ring insert 43 to the piston body 42, Fe—Al is unlikely to be generated and there will be no problem. Consequently, the piston 41 can be improved in both wear resistance and strength.

On the other hand, there is such a problem that cracks are likely to develop in the wall, particularly in corners, of the combustion chamber 42a of the piston 42. According to this Embodiment, since the reinforcement member 44 is joined to the lip in the combustion chamber 42a, cracks are prevented from developing in the wall of the combustion chamber 42a.

Embodiment 6

Figure 22:
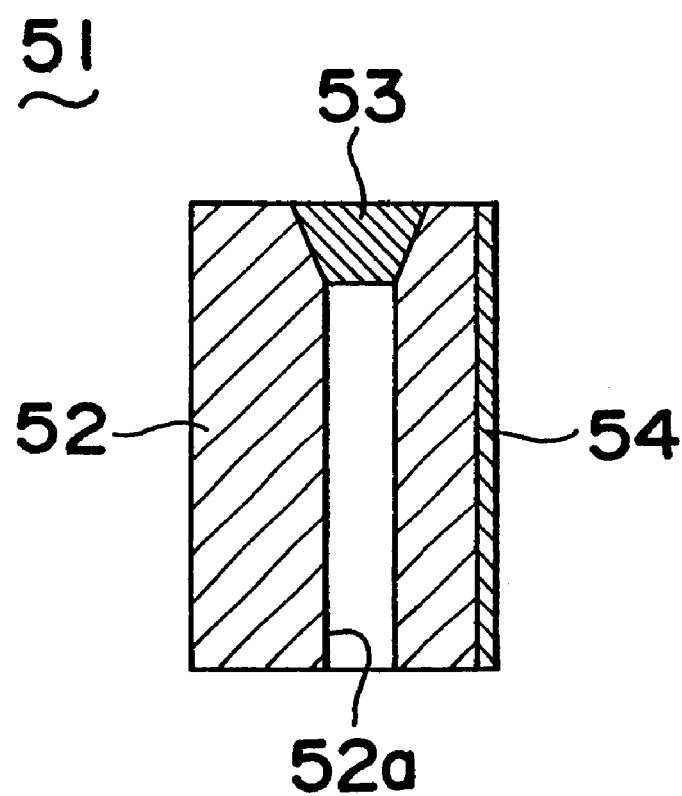
FIG. 22 is a sectional view of the engine cylinder block as the metal member to be joined according to Embodiment 6.

FIG. 22 shows a portion of a cylinder block 51 of an engine which is a joined metal member according to Embodiment 6 of the present invention. The cylinder block 51 comprises, similarly to Embodiment 1, a cylinder block body 52 (second metal member) made of an Al-based material with a rib member 53 (first metal member) made of an Fe-based material joined on top of a water jacket 52a. Numeral 54 denotes a liner made of cast iron fitted in the inner surface of the cylinder.

In the prior art, in order to increase the rigidity of the cylinder block 51, the rib is formed in the upper portion of the water jacket as an integral part thereof by using a sand core when casting the cylinder block body 52. But this method has such a problem that cycle time of casting becomes longer resulting in a low productivity. According to this embodiment, it is made easier to cast the cylinder block body 52, join the rib member 53 on top of the water jacket 52a of the cylinder block 52 in a short time, and increase the rigidity of the cylinder block. Consequently, the liner 54 on the inner circumferential surface of the cylinder can be prevented from deforming, engine performance such as LOC and NVH can be improved and the present invention can be applied to a cylinder block without liner.

Embodiment 7

Figure 23:
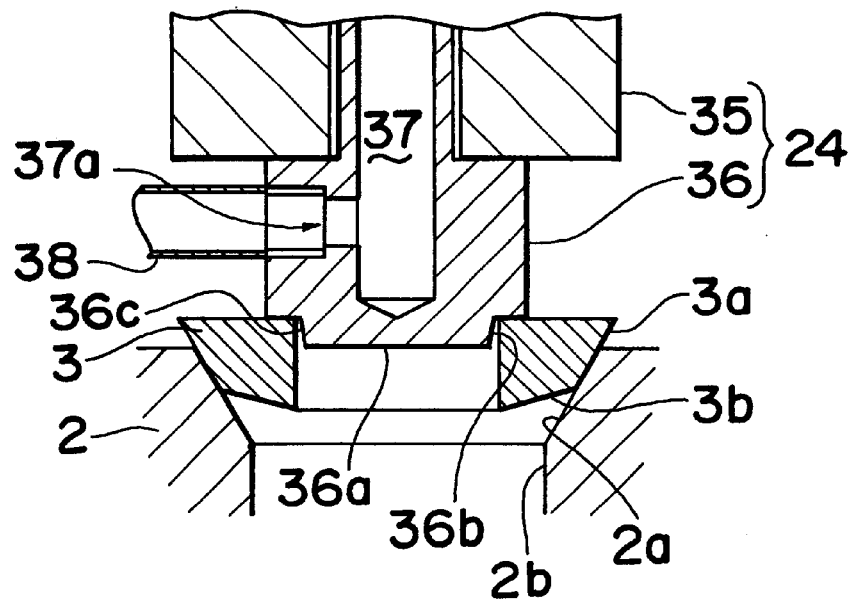
FIG. 23 is a sectional view of an upper electrode in contact to the two joining metal members in a projection welding machine, showing the state of a valve seat and a cylinder head body being joined in another embodiment.

Now preferred embodiments of the present invention will be described below with reference to FIG. 23. While this Embodiment 7 is a case of joining the cylinder head body 2 and the valve seat 3 as in Embodiments 1 to 4, the present invention can also be applied to the case of joining piston body 42 and the ring insert 43 or joining the cylinder block body 52 and the rib member 53 as Embodiments 5 and 6.

This Embodiment 7 is different from Embodiments described above, first in the material of the valve seat 3. The valve seat 3 is a sintered material made of an Fe-based powder material with Cu as a high electrical conductivity element dispersed substantially uniformly therein, and is joined, without infiltrating the inner pores with a Cu-based material as in the above Embodiments. Also, the valve seat 3 is made by immersing it in a filler bath 14 and applying ultrasonic vibration to form the diffusion-joined layer 5 of the brazing material and the valve seat 3 and the brazing material layer 7 on the surface of the valve seat 3 and then removing the brazing material layer 7 from the top (upper electrode 24 contact portion) of the valve seat 3 by machining or the like before bringing the upper electrode 24 into contact. The diffusion-joined layer 5 as well as the brazing material layer 7 may also be removed from the top of the valve seat 3.

Second difference from above Embodiments 1–6 is that the taper angle of the joining surface 2a before joining the valve seat 3 to the cylinder head body 2, which is not about 0.79 rad (45°) but set to about 0.52 rad (30°), same as the taper angle θ1 of the first joining surface 3a of the valve seat 3 and the cylinder head body 2. That is, in contrast to the above Embodiments where current and pressure are applied to the valve seat 3 and the cylinder head body 2 being in linear contact which turns into surface contact in the course of joining, current and pressure are applied with the first joining surface 3a of the valve seat 3 and the joining surface 2a of the cylinder head body 2 are kept in surface contact in this Embodiment 7. The surface contact here refers to contact via an area of 40 to 200 mm$^2$ (preferably 40 to 100 mm$^2$).

Third difference is in configuration of the upper electrode 24 which comprises an electrode body 35 and an electrode tip 36 which has substantially cylindrical shape and is screw-mounted at the tip of the electrode body 35. Formed at the center of the bottom surface of the electrode tip 36 is a projection 36a protruding from the bottom surface (surface to make contact with the valve seat 3) of the electrode tip 36 toward the valve seat 3. The projection 36a is formed in a substantially cylindrical shape which can be fitted onto the inner circumferential surface of the valve seat 3 and has a tapered circumferential surface 36b of diameter slightly decreasing toward the tip. And the projection 36a has a predetermined clearance from the inner circumferential surface (side face along the direction of pressure) of the valve seat 3 over the entire circumference of the side face 36b of the projection 36a when the bottom surface of the electrode tip 36 is in contact with the valve seat 3. Provided at substantially the same height (base portion) as the contact surface making contact with the valve seat 3 over the entire circumference of the side face 36b of the projection 36a is a positioning portion 36c which regulates the movement of the valve seat 3 in substantially horizontal direction (direction substantially perpendicular to the pressure) when applying pressure to the valve seat 3 with the bottom surface of the upper electrode 36. Clearance between the inner circumferential surface of the valve seat 3 and the positioning portion 36c on the circumference of the side face 36b of the projection 36a is set to such an extent (for example about 0.1 mm) that allows the valve seat 3 to move in the horizontal direction, while the clearance between portions other than the positioning portion 36c on the circumference of the side face 36b of the projection 36a and the inner circumferential surface of the valve seat 3 is set to such an extent that hardly restricts deformation of the inner circumferential surface of the valve seat 3 toward the inside (the side where the diameter of the inner circumferential decreases) under the pressure.

Formed in the electrode tip 36 of the upper electrode 24 is a coolant passage 37 extending vertically for passing cooling water (coolant) to cool the inside of the upper electrode 24. Upper end of the coolant passage 37 is connected to the lower end of the coolant passage extending vertically on the electrode body 35, while an inlet for introducing the cooling water is provided on the upper end of the coolant passage of the electrode body 35. Provided at the lower end of the coolant passage 37 of the electrode tip 36 is an outlet 37a of the cooling water opening sideways on the electrode tip 36. In other words, such a configuration is provided as the cooling water inlet is provided on the side opposite to the surface of the upper electrode 24 making contact with the valve seat 3, and the cooling water outlet 37a is provided on the side of contact with the valve seat 3, so that current is passed while cooling the upper electrode (particularly the electrode tip 36) by means of one-way flow of cooling water from the inlet to the outlet. Connected to the outlet 37a is a drainage pipe 38 for draining the cooling water.

According to the Embodiment 7 described above, since the valve seat 3 is made by sintering an Fe-based powder material with Cu as a high electrical conductivity element dispersed substantially uniformly therein, which is then joined without infiltrating the inner pores with a Cu-based material, resistivity of the valve seat 3 can be kept as low as that of one infiltrated with a Cu-based material due to Cu dispersed beforehand therein, despite the presence of the pores. As a result, heat generation when passing the current can be inhibited thereby to achieve satisfactory joining similarly to Embodiments. Also because the thermal conductivity is lower than that of one infiltrated with a Cu-based material due to the heat insulation effect of the pores, heat sink effect of the valve seat 3 is kept at an appropriate level during engine operation resulting in an oxide film being formed, thereby improving the wear resistance of the valve seat 3.

Since the valve seat 3 has a low thermal conductivity as described above, applying the current and pressure under the condition of linear contact as in the above Embodiments causes a significant amount of heat generated in the joining surfaces 2a, 3a, 3b in the early stage of passing the current, thus increasing the possibility of the valve seat 3 to be overheated. In addition, since the strength is relatively low due to the presence of the pores, the first and second joining surfaces 3a, 3b of the valve seat 3 are likely to deform. As a consequence, sufficient plastic flow of the joining surface 2a of the cylinder head body 2 cannot be achieved, making it impossible to achieve sufficient effect of destroying the oxide film. According to this Embodiment 7, however, the current and pressure are applied after bringing the first joining surface 3a of the valve seat 3 and the joining surface 2a of the cylinder head body 2 into surface contact with each other in advance, heat generated in the joining surfaces 2a, 3a, 3b can be controlled to a proper level thereby preventing overheat. Thus it is made possible to prevent excessive hardening even when the valve seat 3 is cooled down quickly as the current is shut down, and prevent deformation of the first and second joining surfaces 3a, 3b of the valve seat 3, thus achieving further better joining.

Since the projection 36a is formed on the bottom surface of the electrode tip 36 of the upper electrode 24 to have a predetermined clearance from the inner circumferential surface of the valve seat 3 when the bottom surface of the electrode tip 36 is in contact with the valve seat 3, and the movement of the valve seat 3 in substantially horizontal direction is regulated at the positioning portion 36c which is set around the base portion on the side circumferential surface 36b of the projection 36a when applying pressure, the movement of the valve seat 3 in substantially horizontal direction can be surely regulated even when the inner circumferential surface of the valve seat 3 deforms inwardly under pressure, and the valve seat 3 can be prevented from being subjected to any significant force in the direction of expanding diameter. As a consequence, there is no possibility of crack developing in the valve seat 3 and the surface of the projection 36a being rubbing against the valve seat 3 when releasing the upper electrode 24 from the valve seat 3 after joining. Also since the side circumferential surface 36b of the projection 36a is formed in such a tapered shape as the diameter decreases toward the tip of the projection 36a, the projection 36a can be released from the inner circumferential surface of the valve seat 3 more smoothly. Thus the valve seat 3 can be positioned in the cylinder head body 2 favorably while preventing cracks from developing in the valve seat 3 and the service life of the upper electrode 24 from shortening.

Since the cooling water inlet is provided on the side opposite to the portion of the upper electrode 24 making contact with the valve seat 3 and the cooling water outlet 37a is provided on the side of contact with the valve seat 3 so that the upper electrode is cooled by means of one-way flow of the cooling water from the inlet to the outlet 37a, a space for round-trip vertical flow of cooling water as required in the prior art is not necessary, thereby making it possible to smoothly flow a sufficient amount of cooling water without stagnating even when the electrode tip 36 of the upper electrode 24 is small in diameter. As a result, the upper electrode 24 can be cooled reliably with a simple method and the service life of the upper electrode 24 can be improved while preventing the upper electrode 24 from softening.

Further since the brazing material layer 7 on the portion of the valve seat 3 to make contact with the upper electrode 24 is removed before bringing the upper electrode 24 into contact therewith, brittle brass can be prevented from being generated at the bottom of the electrode tip 36 of the upper electrode 24 by alloying of Cu content of the electrode tip 36 and Zn content of the brazing material. This, also, contributes to improvement of the service life of the upper electrode 24.

Although Cu is dispersed uniformly throughout the valve seat 3 in the Embodiments described above, Cu content may be made higher in the portion of the valve seat 3 opposite to the cylinder head body 2 than in the portion on the side of the cylinder head body 2, so that the opposite to the cylinder head body 2 has electrical conductivity higher than that of the cylinder head body 2. For example, both components made of different material may be sintered temporarily and then put together and sintered to the final state. This procedure makes it possible to minimize the heat generated in the valve seat 3, control the amount of heat generated in the joining surfaces 2a, 3a, 3b to a proper level and render the material in the vicinity of the first and second joining surfaces 3a, 3b of the valve seat 3 high strength and high wear resistance. Thus the first and second joining surfaces 3a, 3b of the valve seat 3 can be more effectively prevented from deforming due to overheat when joining, while the valve joining surface 3c formed in the final stage by removing the portion opposite to the cylinder head body 2 comes to consist of a material having high strength and high wear resistance. The particles having high electrical conductivity dispersed in the powdery material before sintering is not limited to Cu, and powdery material of Ag having high electrical conductivity or an element having electrical resistivity not higher than $3 \times 10^{-8}$ $\Omega \cdot m$ may be dispersed before sintering. In this case, the element has thermal conductivity preferably 2 J/cm·s·K.

Figure 24:
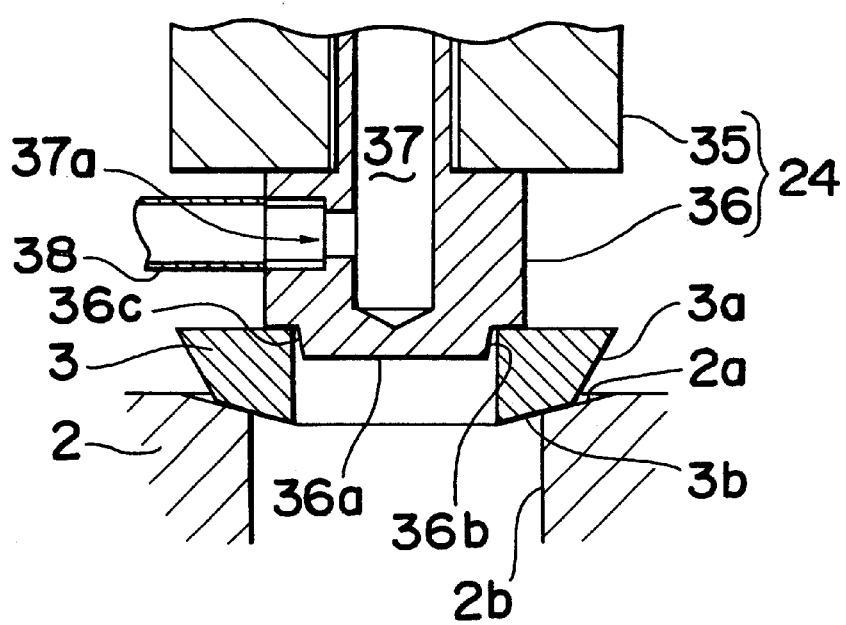
FIG. 24 is a sectional view, similar to FIG. 23, showing the state of a second joining surface of the valve seat and the joining surface of the cylinder head body being brought into surface contact with each other.
Figure 25:
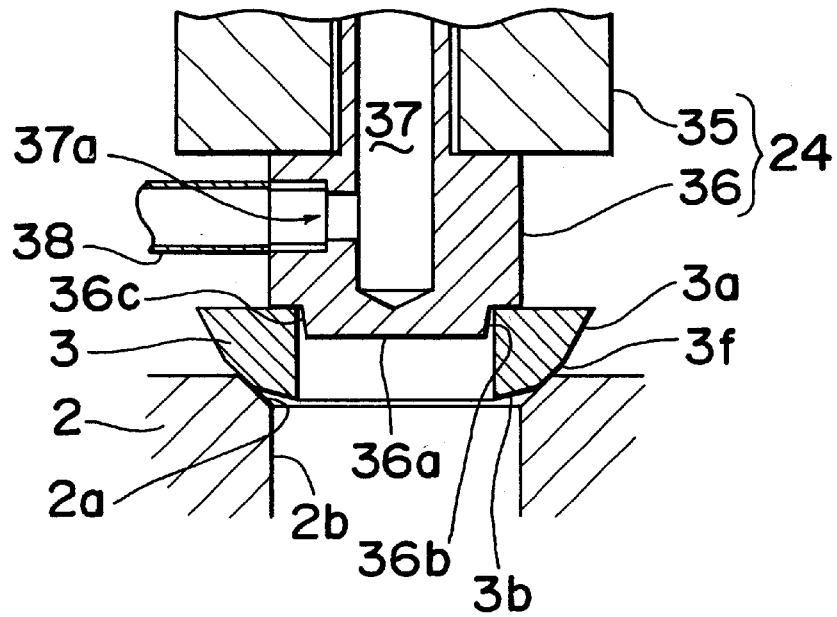
FIG. 25 is a sectional view, similar to FIG. 23 showing the state of a third joining surface of the valve seat and the joining surface of the cylinder head body being brought into surface contact with each other.
Figure 26:
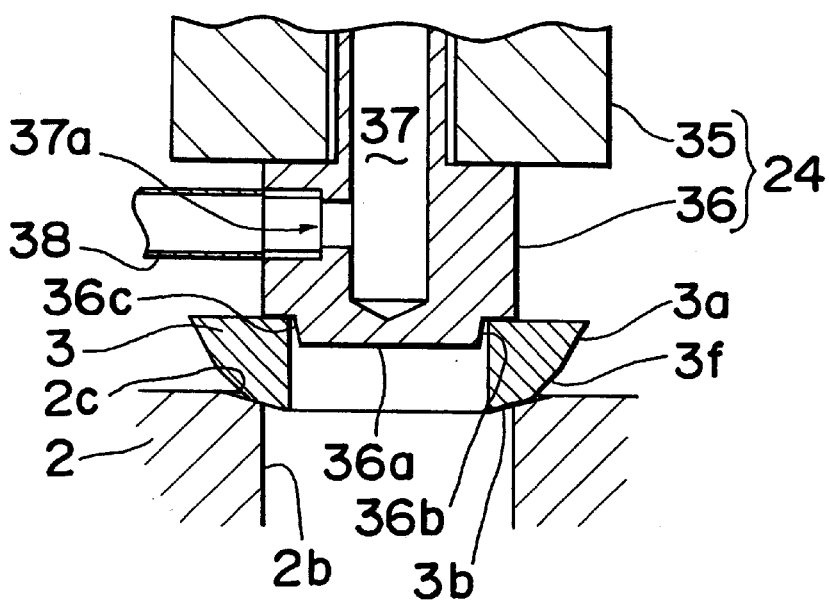
FIG. 26 is a sectional view, similar to FIG. 23, showing the state of a second joining surface of the valve seat wherein the third joining surface is formed and the joining surface of the cylinder head body being brought into surface contact with each other.

Although the current and pressure are applied with the first joining surface 3a of the valve seat 3 and the joining surface 2a of the cylinder head body 2 having been brought into surface contact in the Embodiments described above, the second joining surface 3b of the valve seat 3 and the joining surface 2a of the cylinder head body 2 may also be brought into surface contact as shown in FIG. 24. Such a configuration may also be employed as a third joining surface 3f is formed between the first joining surface 3a and the second joining surface 3b of the valve seat 3, while the third joining surface 3f and the joining surface 2a of the cylinder head body 2 are brought into surface contact (FIG. 25), or the second joining surface 3b of the valve seat 3 whereon the third joining surface 3f is formed and the joining surface 2a of the cylinder head body 2 are brought into surface contact (FIG. 26). The process of making surface contact in advance is not limited to the case where the valve seat 3 is a sintered material made of an Fe-based powdery material with particles having high electrical conductivity such as Cu dispersed therein, and can be applied to such a case as the valve seat 3 is a sintered material made of a powdery material consisting only of an element having relatively low electrical conductivity (element having electrical resistivity of $3 \times 10^{-8}$ $\Omega \cdot m$ or higher) which has been used in the prior art (without infiltration of Cu-based material). Or otherwise, the valve seat 3 may also be a material consisting only of an element having relatively low electrical conductivity. Possibility of the valve seat 3 being overheated can be minimized also in such cases.

Figure 27:
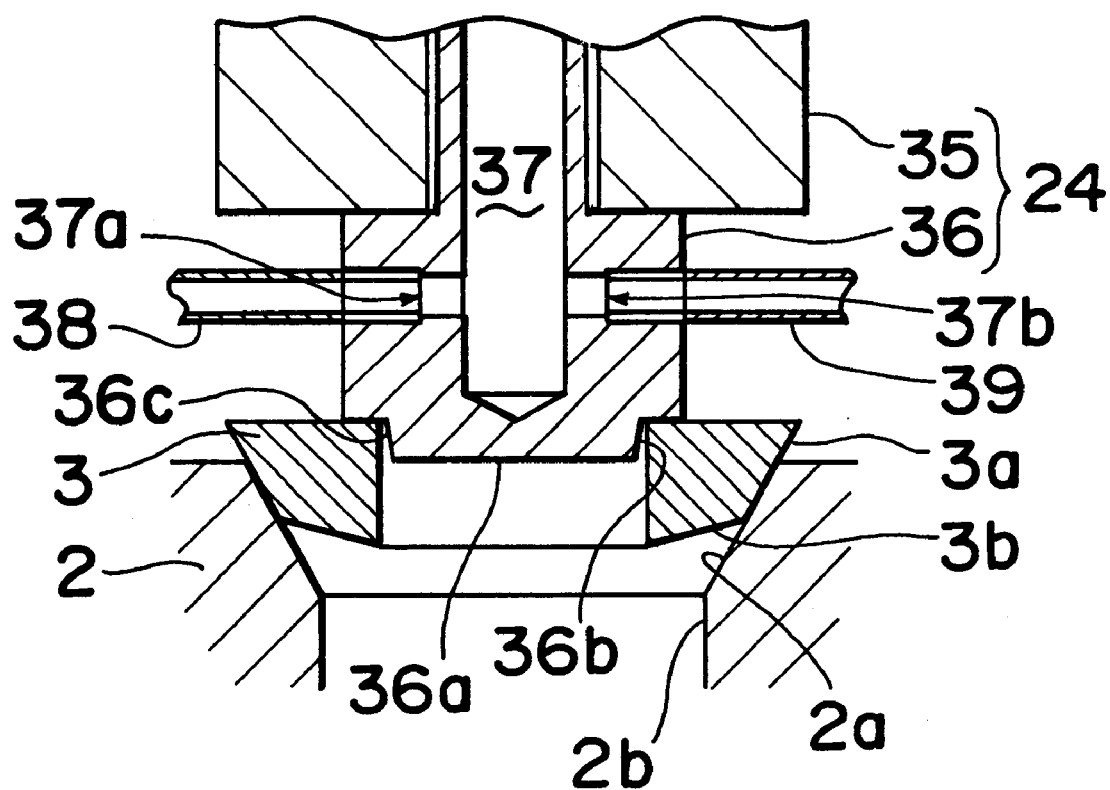
FIG. 27 is a sectional view, similar to FIG. 23, particularly showing another mechanism of cooling an upper electrode of the welding machine.

Further, although the cooling water inlet is provided on the side opposite to the portion of the upper electrode 24 making contact with the valve seat 3 and the cooling water outlet 37a is provided on the side (the electrode tip 36) of contact with the valve seat 3 in the Embodiments described above, the positional relationship of the inlet and the outlet 37a maybe reversed. In order to further improve the effect of cooling the electrode tip 37 of the upper electrode 24, an auxiliary inlet 37b may be provided separately from the inlet on the opposite side to the outlet 37a with respect to the electrode tip 37, as shown in FIG. 27. In FIG. 27, numeral 39 denotes a pipe for supplying the cooling water connected to the auxiliary inlet 37b by screwing. The lower electrode 25 may also be cooled by means of one-way flow of cooling water similarly to the upper electrode 24.

The method of positioning the valve seat 3 in the substantially horizontal direction according to the Embodiments described above may be applied, not only to the case of melting the brazing material of the brazing material layer 7 by electrical resistive heating but also to the case of melting the brazing material by local heating through induction heating or the like as described in conjunction with the advanced Embodiments.

Although the valve seat 3 and the cylinder head body 2 are joined in liquid phase diffusion state with the diffusion-joined layer 5 and the molten reaction layer 6 interposed therebetween in the Embodiments described above, similar effects as those of the Embodiments described above can be achieved with any method as far as the metal members are joined by heat generated with current and pressure applied, such as the case of joining the members by the conventional resistive welding or solid phase diffusion welding, except that the brazing material layer 7 is removed from the portion of the valve seat 3 in contact with the upper electrode 24 in advance. With regard to the removal of the brazing material layer 7 in advance, any method may be employed as far as the valve seat 3 and the cylinder head body 2 are joined by heat generated with current and pressure applied after immersing the valve seat 3 in the brazing material bath 14 and forming the brazing material layer 7 via the diffusion-joined layer 5 on the surface of the valve seat 3.

EXAMPLES

Now specifically carried out Examples will be described below. First Basic Examples corresponding to the Embodiments described above will be described.

Figure 28:
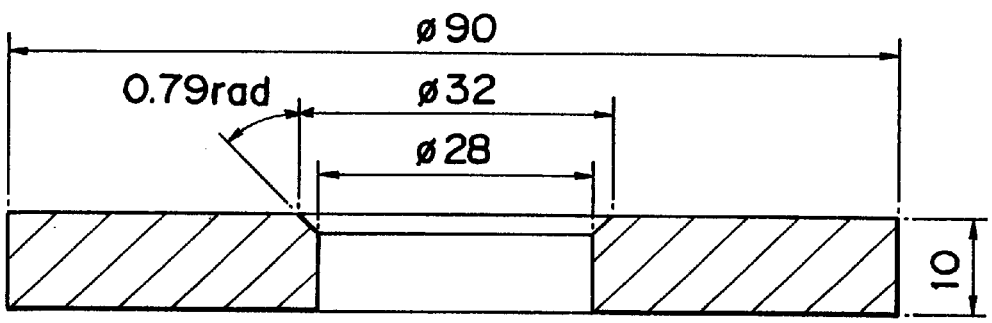
FIG. 28 shows a sectional view showing a test piece used in joining in the Examples.

First, a test piece 61 was made by using a cast Al alloy (AC4D defined in JIS H5202) as shown in FIG. 28 as the second metal member. The test piece 61 was subjected to a T6 heat treatment.

Then, 5 kind of Fe-based valve seats were made by changing the method of coating with the brazing material, seat shape and the taper angle θ1 of the first joining surface (Basic Examples 1 to 5), as shown in Table 1.

TABLE 1

| | Basic Example | | | | | Prior |
|---|---|---|---|---|---|---|
| | 1 | 2 | 3 | 4 | 5 | art |
| coating | Fr. | U.s. | U.s. | U.s. | U.s. | — |
| Seat shape | Thin wall | Thin Wall | Thick Wall | Thick Wall | Thick wall | Thick wall |
| θ 1 (rad) | 0.35 | 0.35 | 0.35 | 0.52 | 0.52 | 0.52 |
| Pressure applied joining (N) | 9807 | 9807 | 9807 | 9807 | 29420 | 29420 |
| Current (kA) | 44 | 44 | 50 | 50 | 60 | 70 |

Fr.; friction, U.s.; Ultrasonic

Figure 29:
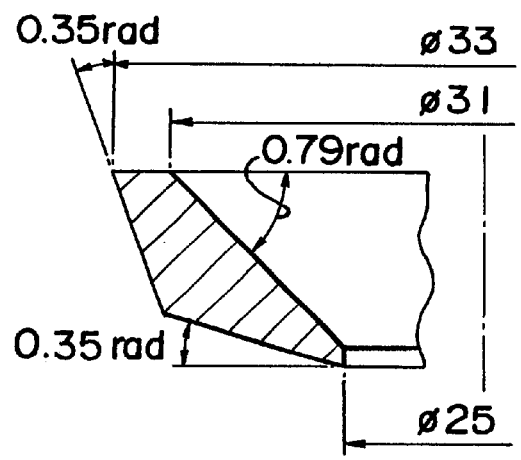
FIG. 29 shows a sectional view of a valve seat having a thin ring.
Figure 30:
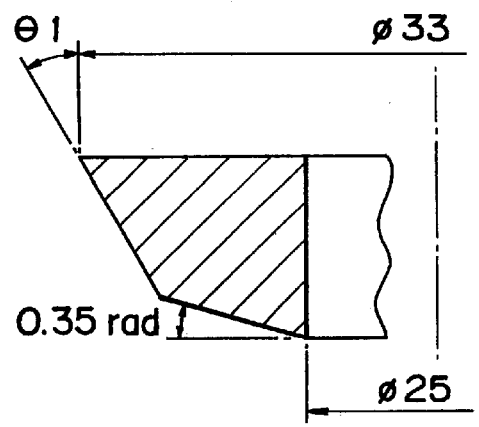
FIG. 30 shows a sectional view of a valve seat having a thick ring.

In Table 1, "Friction" in the column of the method of coating with brazing material refers to the method of coating by rubbing the brazing material and breaking the oxide film when forming the diffusion-joined layer and the brazing material layer on the surface of the valve seat. "Ultrasonic" refers to the method of coating with the brazing material by ultrasonic plating as described in conjunction with Embodiment 1. the term "Thin wall" in the column of seat configuration refers to the valve seat having a configuration near the final shape with thin wall, as shown in FIG. 29. "Thick wall" refers to the configuration similar to that of the above Embodiments 1–6 with thick wall as shown in FIG. 30.

The valve seat was produced by sintering a powdery iron-based material with some alloyed compositions, for example, as shown in table 2 (except for Cu) dispersed therein. In Table 2, numerical values are given in terms of % by weight and TC refers to total carbon (total amount of carbon in forms of free carbon (graphite) and cementite).

TABLE 2

| | chemical composition (%) | | | | | | | | |
|---|---|---|---|---|---|---|---|---|---|
| | TC | Ni | Cr | Mo | Cu | W | Co | V | Fe |
| A | 1.0–1.6 | 1.0–3.0 | 5.5–8.0 | 0.3–0.8 | 11.0–18.0 | 1.5–3.0 | 5.0–8.0 | — | Bal. |
| B | 1.3–4.0 | — | 0.4–7.0 | 0.1–0.4 | 10.0–20.0 | 1.2–3.4 | 0.4–1.7 | 0–0.34 | Bal. |
| C | 0.5–1.5 | — | 1.0–5.0 | 2.0–6.0 | 10.0–20.0 | 1.0–3.0 | 0.5–2.0 | — | Bal. |
| D | 0.5–1.5 | 5.0–10.0 | — | 10.0–15.0 | 7.0–18.0 | — | — | — | Bal. |

As a brazing material, a Zn—Al eutectic alloy consisting of 95% by weight of Zn, 4.95% by weight of Al and 0.05% by weight of Mg was used.

The valve seats were infiltrated with Cu-based material and were coated with Cu plating on the surface.

The valve seats of Basic Examples 1 to 5 were joined to the test piece 61 by the welding apparatus similarly to Embodiment 1. The pressure and current applied when joining were set to the values shown in Table 1. Current was controlled to achieve substantially constant depth of embedding the valve seat, as a change in the pressure causes the contact resistance between the valve seat and the test piece 61 leading to a change in the depth.

For comparison, valve seats of thick wall with $\theta 1=0.52$ rad (30°) (coated with Cu plating) were made by solid phase diffusion joining (pressure welding) with the pressure and current being set to 29429 N (3000 kgf) and 70 kA, respectively.

Figure 31:
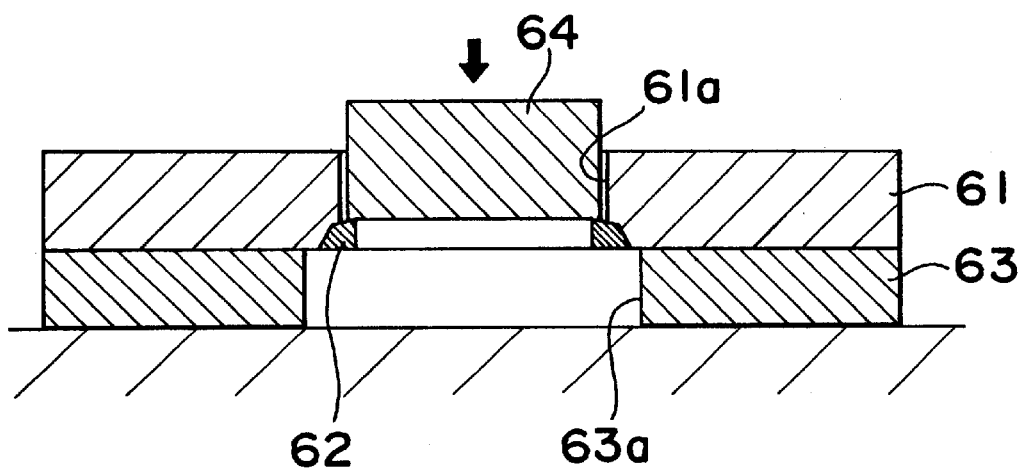
FIG. 31 is a schematic sectional view of a test piece of a joined member, showing the process of measuring the knock-off load measuring test.

Then joining strength as measured on the valve seats of Basic Examples 1 to 5 and the prior art. The test piece 61 was placed on the top surface of a fixture 63 with the side where the valve seat 62 is joined facing downward as shown in FIG. 31. The valve seat 62 is placed over a through hole 63a made at substantially the center of the fixture 63 to keep the valve seat 62 from contact with the fixture 63. A cylindrical pressure jig 64 was put into the through hole 61a of the test piece 61 from above to press the valve seat 62, and knock-off load was measured at the time the valve seat 62 came off the test piece 61. The knock-off load represents the joining strength.

Figure 32:
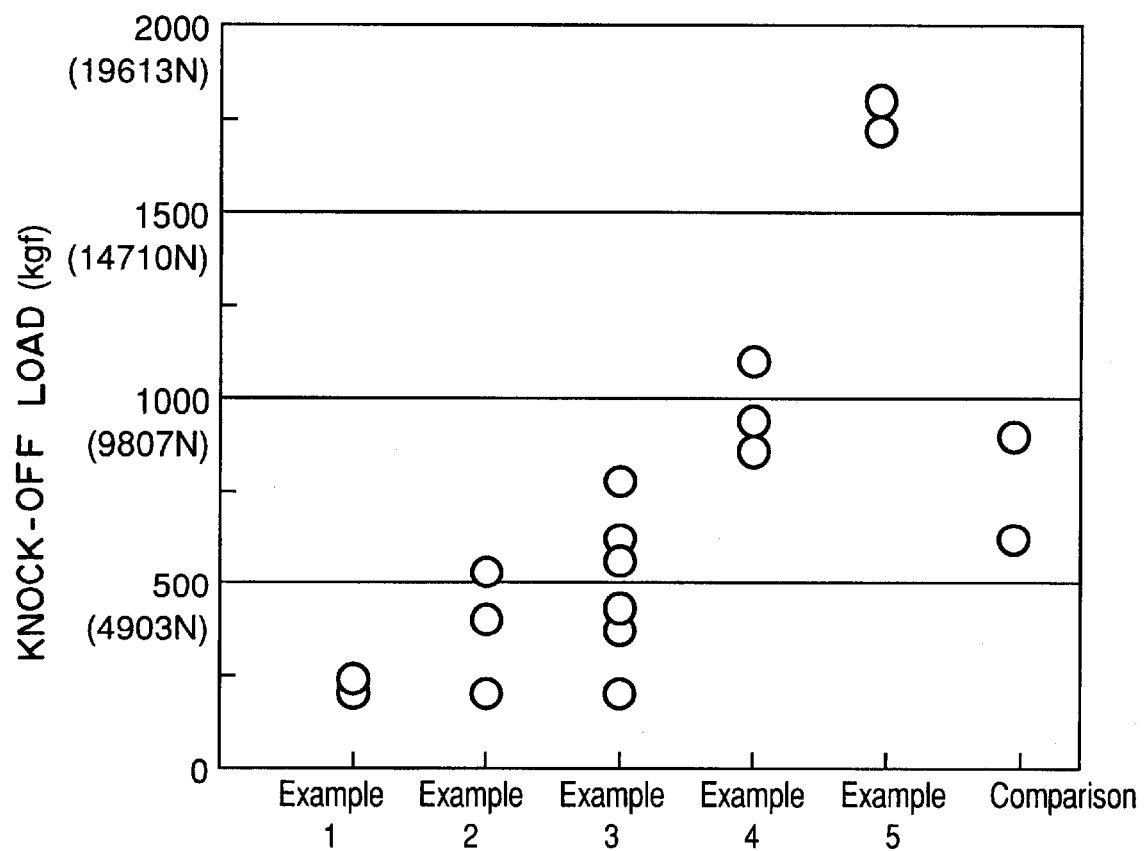
FIG. 32 is a graph showing the knock-off load data measured on the valve seats of Examples 1 to 5 and a conventional joint.

Results of the knock-off load measuring test are shown in FIG. 32. Comparison of Basic Example 1 and Basic Example 2 shows that higher joining strength can be obtained by forming the diffusion-joined layer and the brazing material layer on the surface of the valve seat by ultrasonic plating, than rubbing the brazing material for coating. This is supposedly because the diffusion-joined layer was not fully formed in Basic Example 1, as the diffusion-joined layer remained on the surface of the valve seat after test in Basic Example 2 (see FIG. 35) as will be described later, while the brazing material and the diffusion-joined layer were hardly observed in Basic Example 1.

Figure 33:
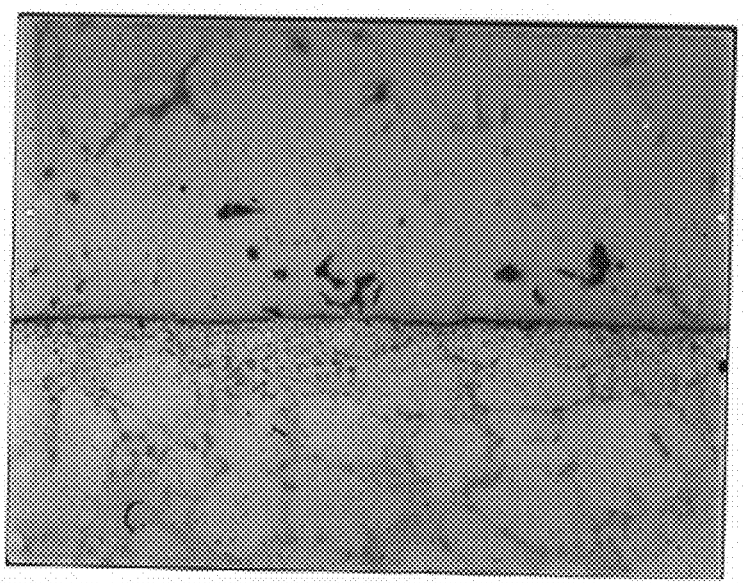
FIG. 33 is a microphotograph showing the surface of the valve seat immediately after applying ultrasonic plating.
Figure 34:
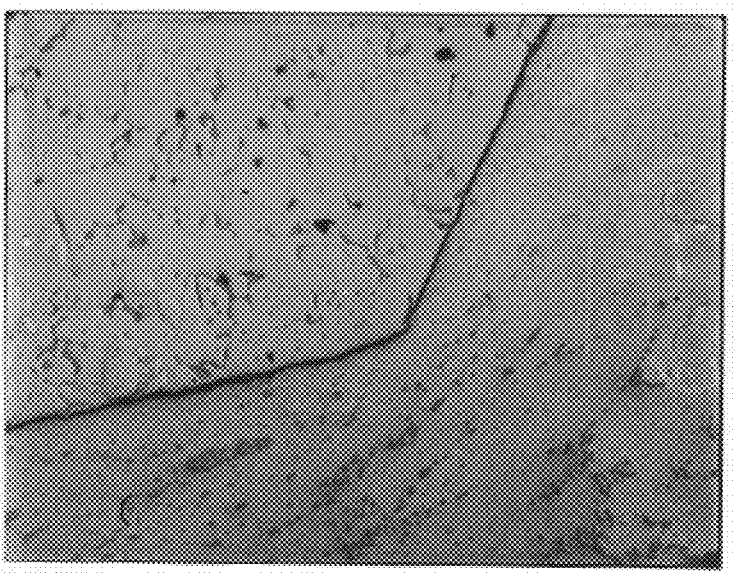
FIG. 34 is a microphotograph showing the section of the valve seat and the test piece being joined in Basic Example 2.
Figure 35:
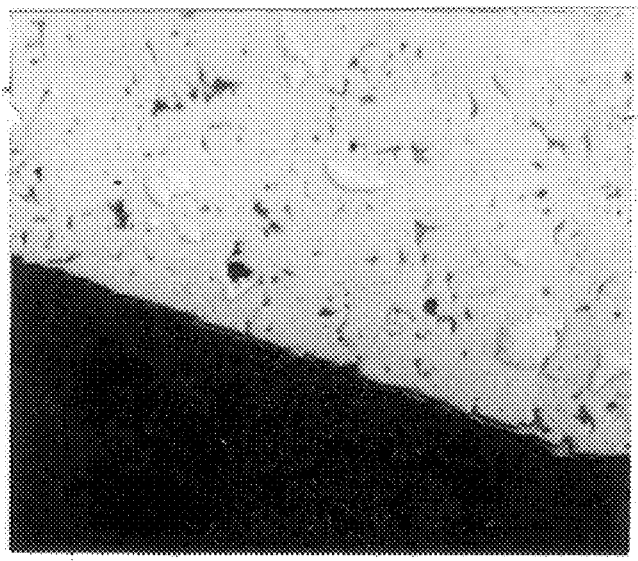
FIG. 35 is a microphotograph showing the valve seat surface immediately after the knock-off load measuring test.

FIG. 33 shows a microphotograph (magnified 180 times) of the valve seat surface immediately after applying ultrasonic plating in Basic Example 2, FIG. 34 shows a microphotograph (magnified 360 times) of the joining surfaces of the valve seat and the test piece 61 after joining, and FIG. 35 shows a microphotograph (magnified 360 times) of the valve seat surface after the knock-off load measuring test. In FIG. 33, the valve seat is located at the top with the brazing material layer formed below via the thin diffusion-joined layer, not Cu plating layer. It can be seen that there are pores infiltrated with Cu-based material inside the valve seat. In FIG. 34, there is not a gap between the valve seat and the test piece 61 located below, and the diffusion-joined layer and the molten reaction layer are clearly observed. FIG. 35 shows the thin diffusion-joined layer remaining on the surface of the valve seat (lower surface).

Comparison of Basic Example 2 and Basic Example 3 shows that the valve seat of thick wall requires a greater knock-off load than that of thin wall. This supposedly because the pressure actually acting on the joined surface decreased due to deformation, as the valve seat showed deformation on the corners in Basic Example 2.

Comparison of Basic Example 3 and Basic Example 4 shows that better effect of breaking the oxide film and higher joining strength can be obtained in Basic Example 4 with larger taper angle $\theta 1$ of the first joining surface, as described in conjunction with Embodiment 1.

Comparison of Basic Example 4 and Basic Example 5 shows that higher joining strength can be obtained in Basic Example 5 where the pressure is greater. It can also be seen that the joining strength can be greatly improved over the prior art by setting the pressure to set to 29429 N (3000 kgf).

Figure 36:
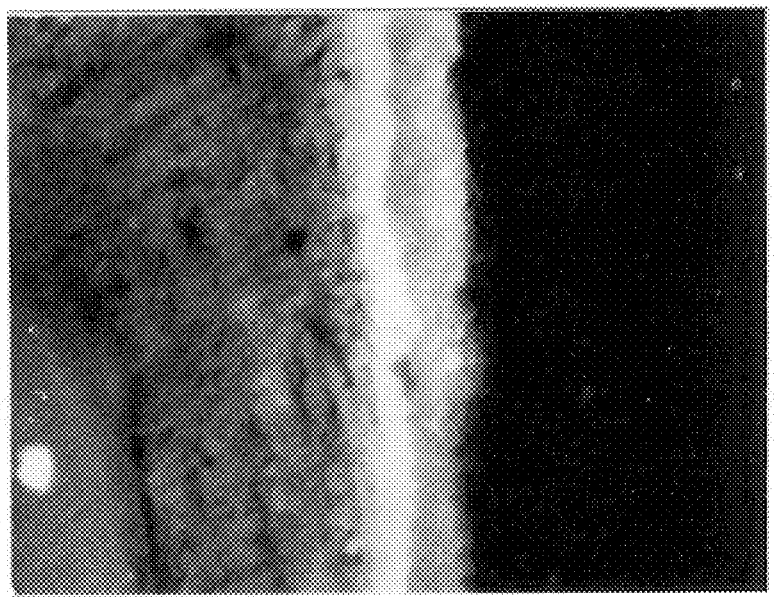
FIG. 36 is a microphotograph showing the section of the valve seat and the test piece being joined in Basic Example 5.

FIG. 36 shows a microphotograph (magnified about 10,000 times) of the joining surfaces of the valve seat and the test piece 61 after joining in Embodiment 5. The valve seat (including the portion appearing white) is shown on the left-hand side and the test piece 61 on the right-hand side in this photograph. The diffusion-joined layer and the molten reaction layer are shown in the gray portion in-between. It can be seen that both layers are about 1 $\mu$m thick. Element analysis showed that these layers included Fe, Zn and Al.

Effect of the pressure was studied more closely as follows. The valve seat was joined to the test piece 61 with pressures of 9807 N (1000 kgf), 14710 N (1500 kgf) and 29420 N (3000 kgf) while the method of coating with the brazing material, seat shape and the taper angle $\theta 1$ were set similarly to Basic Examples 4, 5. Then the knock-off load was measured similarly to the first knock-off load measuring test.

Hardness was measured on the test pieces 61 subjected to the pressures of 9807 N (1000 kgf) and 29420 N (3000 kgf) after joining. Hardness was measured at predetermined intervals in a direction inclined by about 0.79 rad (45°) toward the side opposite to the place where the valve seat is joined, from the corner (point where distance=0 from joined surface in FIG. 38) between the first joining surface and the second joining surface of the valve seat toward the periphery of the test piece 61.

Figure 37:
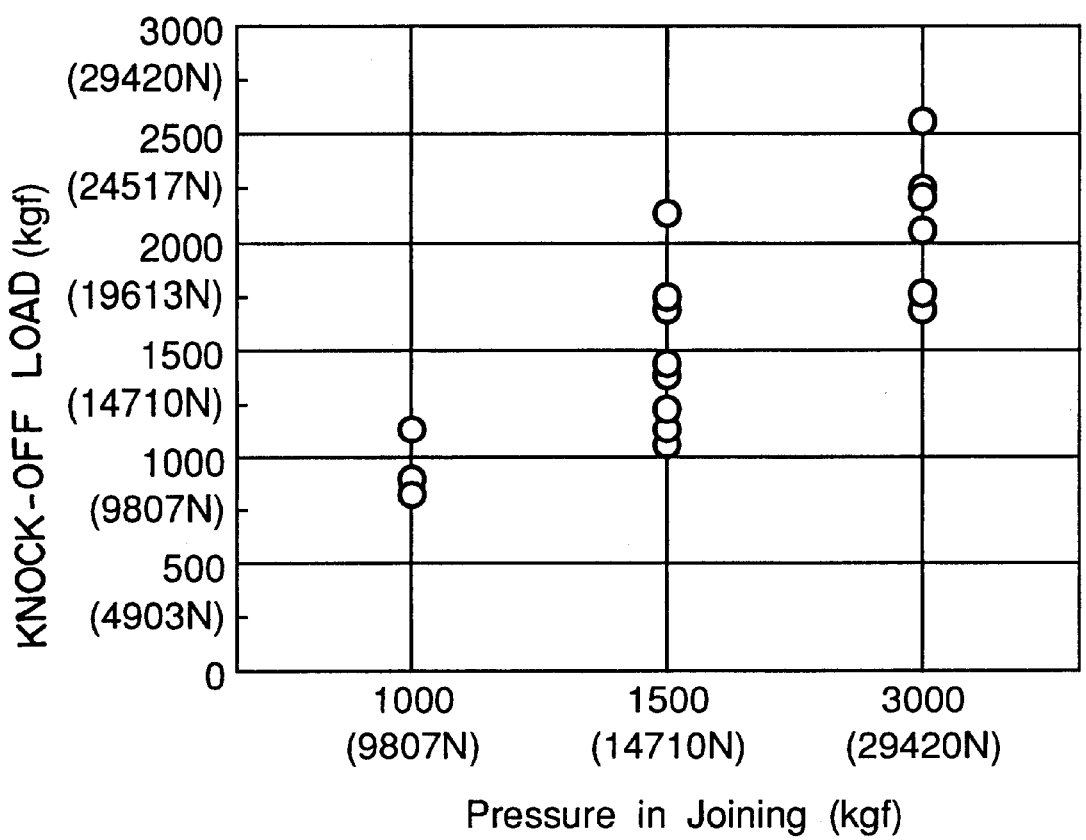
FIG. 37 is a graph showing the relationship between the pressure applied on joining and knock-off load.
Figure 38:
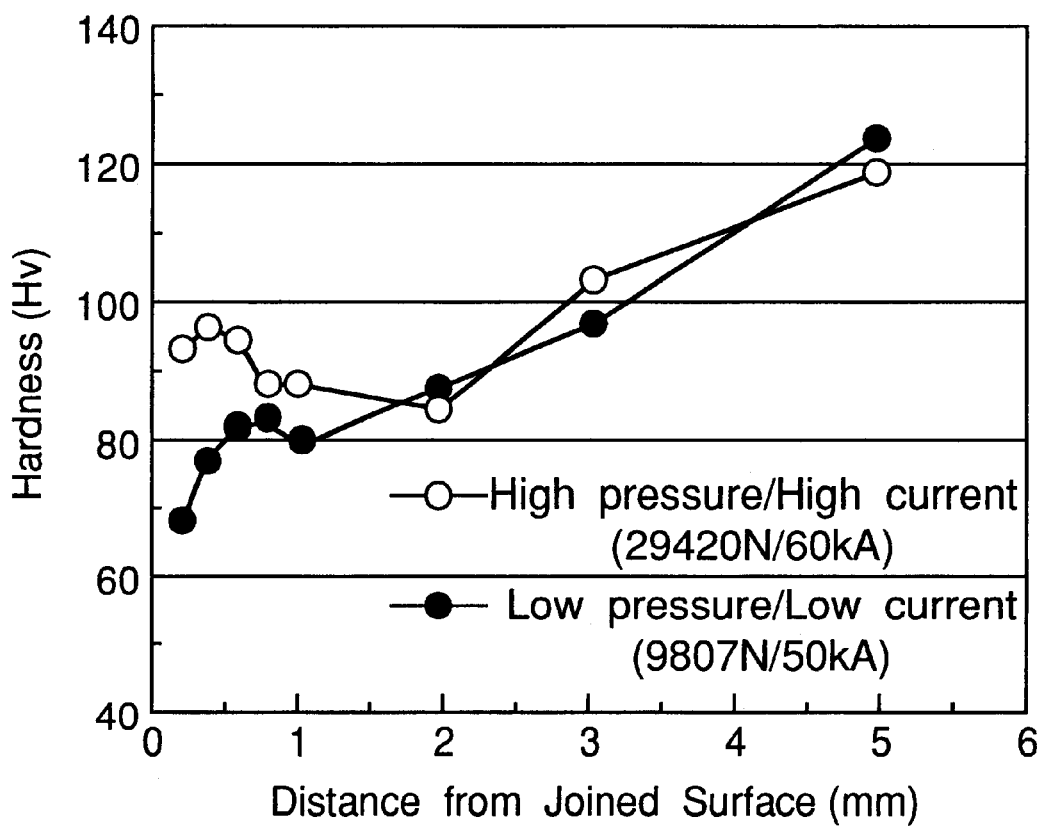
FIG. 38 is a graph showing changes in hardness with distance from the joined surface of the test piece.

Results of the knock-off load test are shown in FIG. 37 and results of the hardness test are shown in FIG. 38. It can be seen that higher joining strength and higher hardness in the vicinity of the joined surface of the test piece 61 can be obtained with greater pressure. This is because greater pressure decreases the contact resistance and leads to less heat generation, thereby restricting softening of the test piece 61. When softening is restricted, plastic flow is surely achieved with greater effect of breaking the oxide film, and discharge of the brazing material is also carried out reliably.

Then the effect of supplying pulse current was investigated by joining the valve seat to the test piece 61 with pulse current of 70 kA. Duration of the current pulse was set to 0.5 seconds with an interval of 0.1 seconds of zero current. Six pulses were delivered. For comparison, the valve seat was joined to the test piece 61 by supplying continuous current (current of 60 kA for 2 seconds). Pressure of 29420 N (3000 kgf) was applied in both cases.

On the tests pieces joined by pulse current and continuous current, hardness was measured, before and after joining, at the upper and lower ends (portion A) and at the middle portion in the vertical direction (portion B) of the valve seat. Hardness and knock-off load were measured at predetermined intervals in a direction inclined by about 0.79 rad (45°) toward the side opposite to the place where the valve seat is joined, from the corner between the first joining surface and the second joining surface of the valve seat toward the periphery of the test piece 61.

Figure 39:
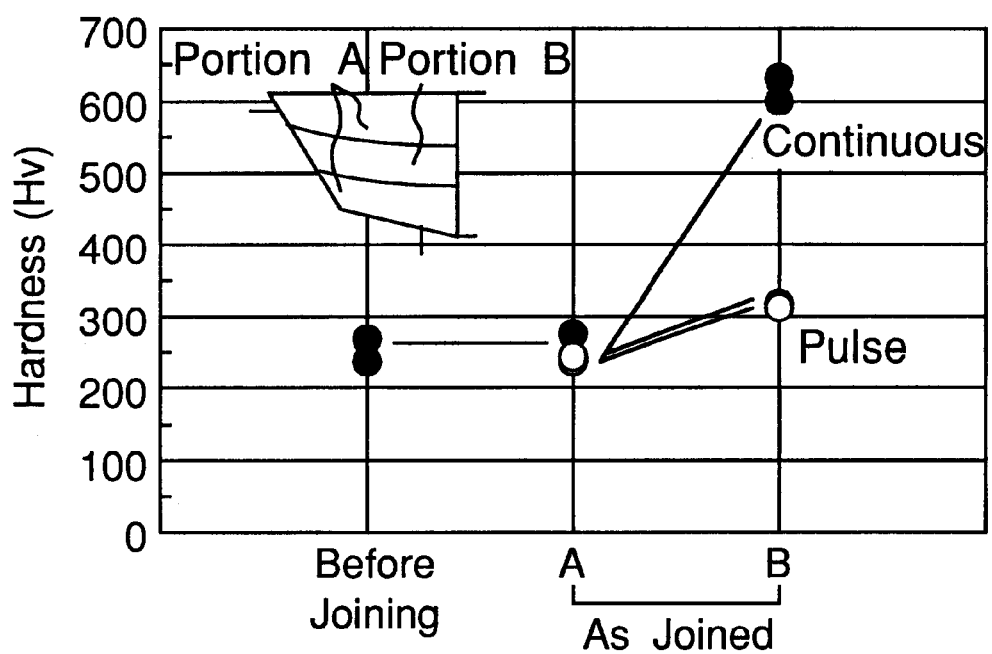
FIG. 39 is a graph showing changes in hardness before and after joining the valve seat with continuous supply of current and pulse current.

Measurements of hardness before and after joining are shown in FIG. 39. It can be seen that hardness of the middle portion in the vertical direction (portion B) becomes very high after joining with continuous current, while no significant increase in the hardness is caused by pulse current due to gradual heating.

Figure 40:
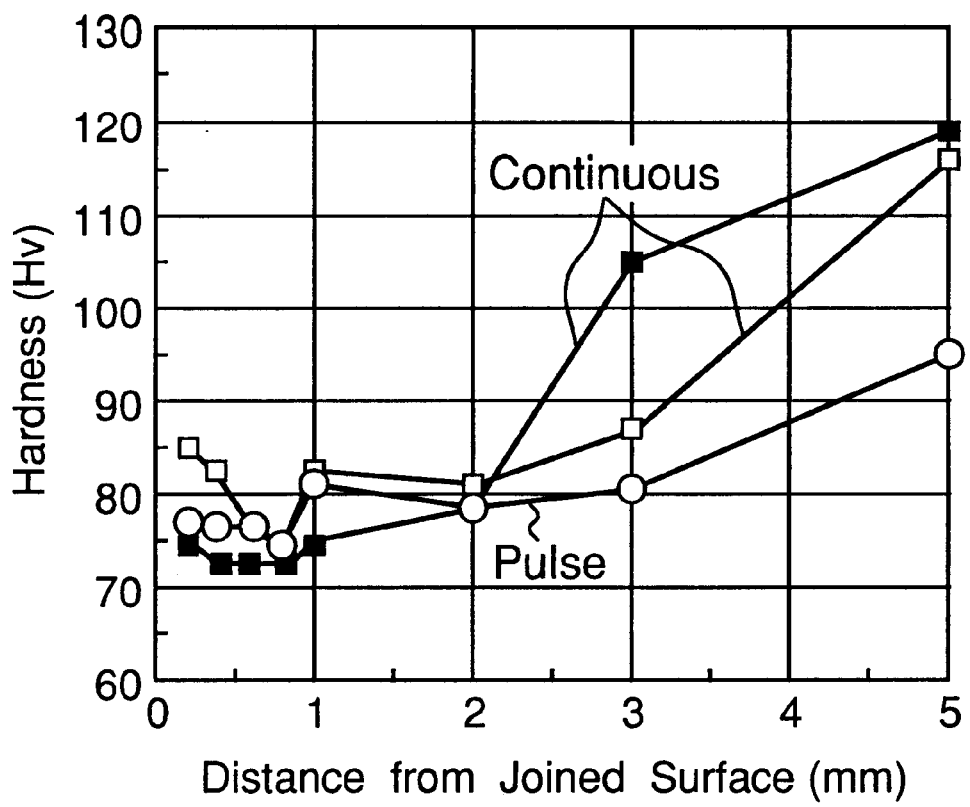
FIG. 40 is a graph showing the change in hardness with the distance from the joined surface of the test piece with continuous supply of current and pulse current.

Measurements of hardness with different distances from the joined surface are shown in FIG. 40. It can be seen that the test piece 61 joined by pulse current has lower hardness due to the heat transmitted from the valve seat.

Figure 41:
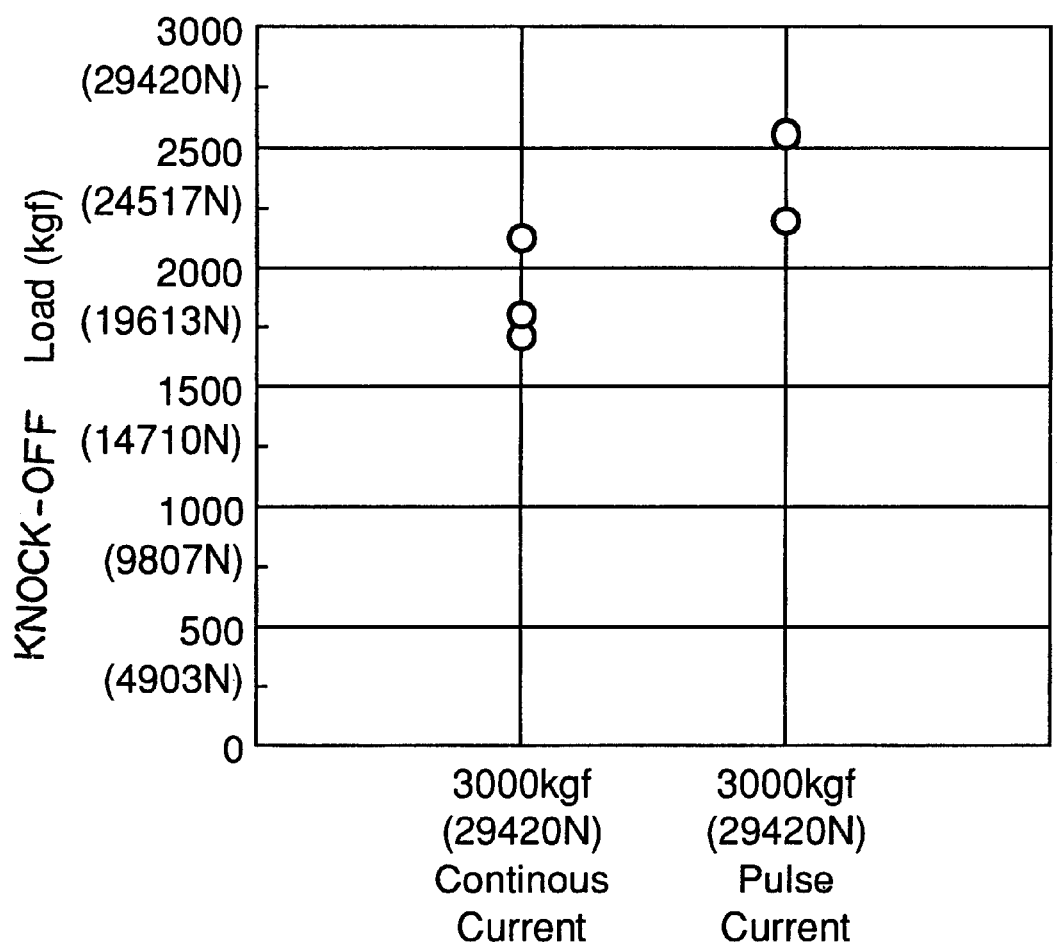
FIG. 41 is a graph showing the results of the knock-off load measuring test with continuous supply of current and pulse current.

Results of knock-off load measurements are shown in FIG. 41. Supplying pulse current makes it possible to reduce the temperature difference between the valve seat and the test piece 61 through heat dissipation through the test piece 61 thereby minimizing the difference in the amount of shrinkage and improve the joining strength, while restricting the increase in hardness by gradual cooling of the inside of the valve seat.

Figure 42:
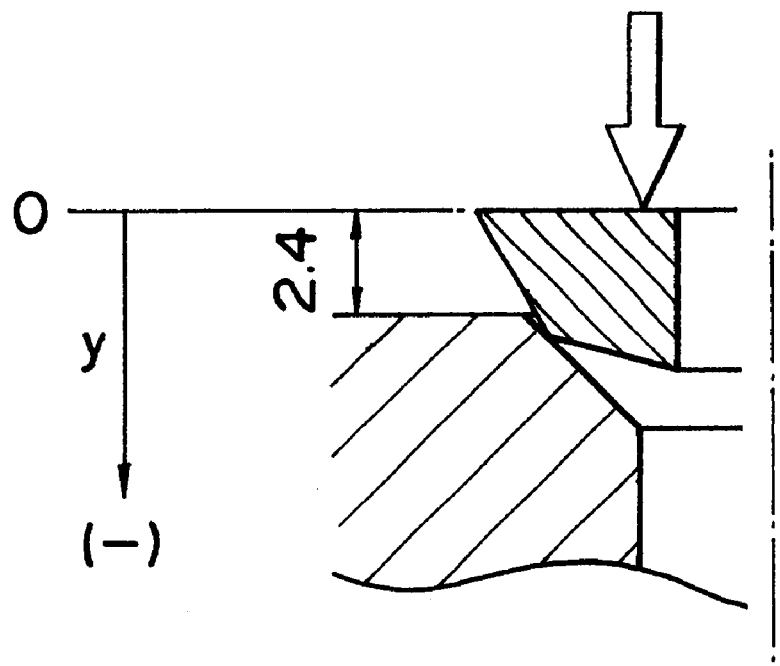
FIG. 42 is a diagram showing a depth y of embedding in the settlement measuring test.

Then in order to investigate the process where the valve seat is embedded in the test piece 61, displacement y the valve sheet (see FIG. 42) was measured every a fixed period after beginning applying the pressure. Pulse current of 68 kA was supplied. Duration of the pulse current (H), length of interval with zero current (C) and the number of pulses (N) were variable from basic conditions of 0.5 seconds, 0.1 seconds and 6 pulses, respectively. Tests were conducted with only one of these parameters being changed from the basic condition (changed parameters are shown in FIG. 43).

Figure 43:
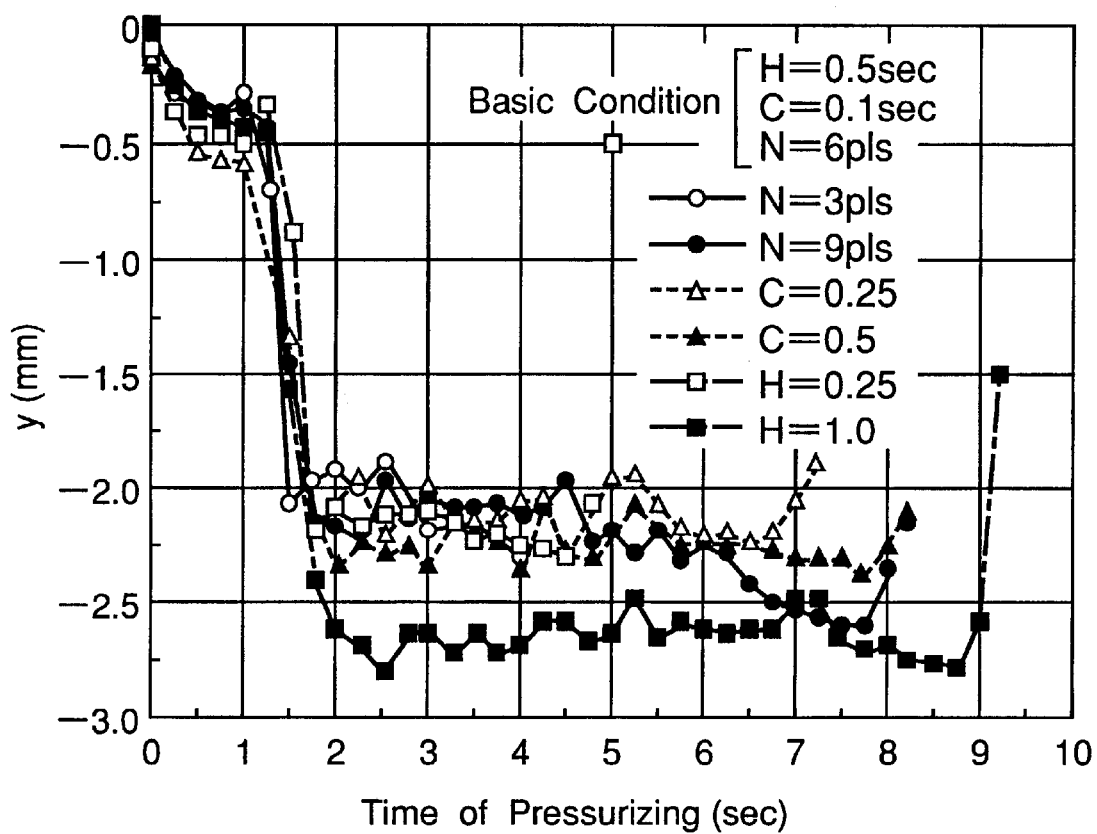
FIG. 43 is a graph showing the change in depth y to be embedded with time after the beginning of application of pressure.

Results of measurements of the displacement are shown in FIG. 43. It can be seen that embedding is almost completed by the first pulse current, and embedding does not proceed with the subsequent pulses. Displacement hardly changes within the range of conditions of this test. When duration of the pulse is as long as 1 second, however, displacement becomes slightly larger during the first pulse, and larger number of pulses, for example 9, causes the test piece 61 to soften and embedding to continue. Therefore it is preferable that the first pulse be set to enable embedding of the valve seat and the second and the subsequent pulses be set to enable gradual cooling of the valve seat and heat dissipation to the cylinder head body.

Then valve seats made of forge sintering were joined to the test piece 61 by supplying pulse current of 60 kA with pressure of 29420 N (3000 kgf). Duration of the pulse current, length of interval with zero current and the number of pulses were set to 0.5 seconds, 0.1 seconds and 4 pulses, respectively. For comparison, valve seat made of a sintered material infiltrated with a Cu-based material was joined to the test piece 61 with pulse current of 53 kA. Hardness was measured on the valve seat made of forge sintering and the valve seat made of infiltrated sintering at predetermined intervals in a direction inclined by about 0.79 rad (45°) toward the side opposite to the place where the valve seat is joined, from the corner (point where distance=0 from joined surface in FIG. 38) between the first joining surface and the second joining surface of the valve seat toward the periphery of the test piece 61.

Figure 44:
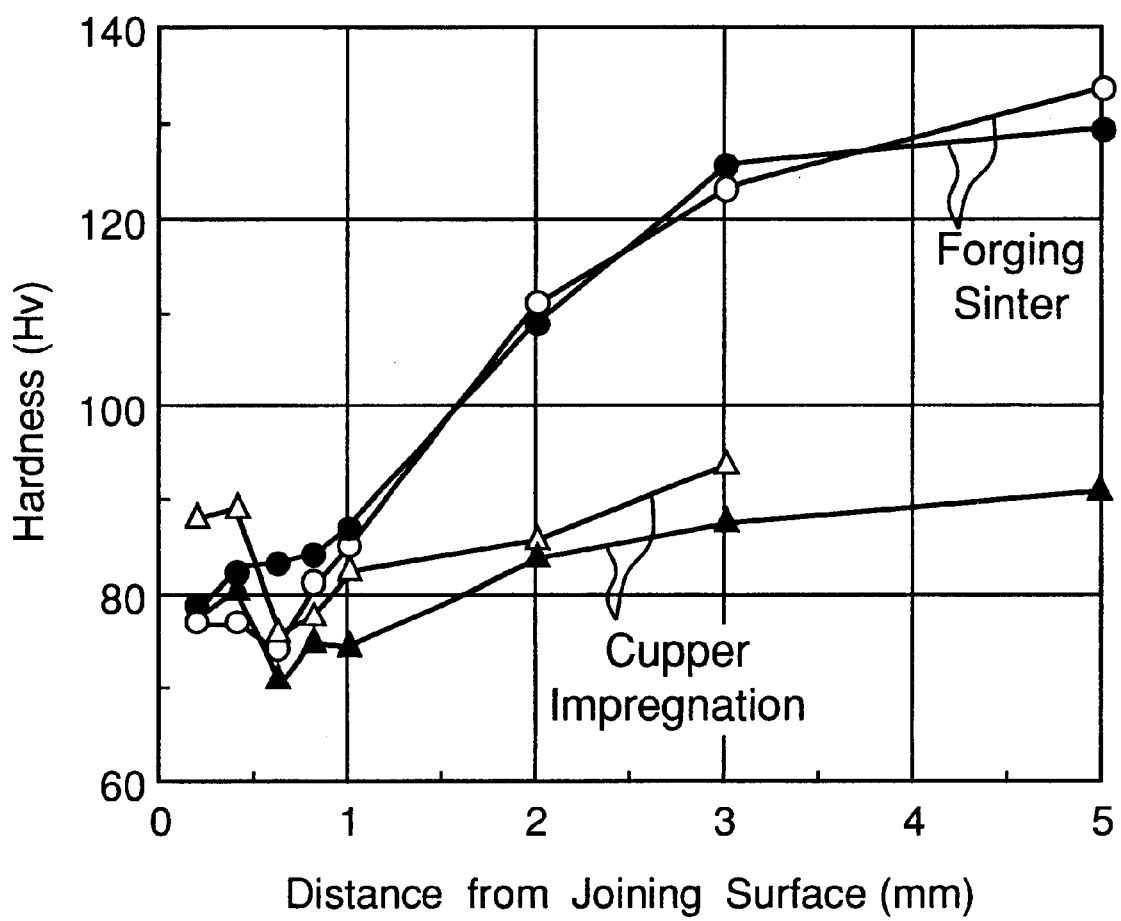
FIG. 44 is a graph showing changes in hardness with distance from the joined surface of the test piece with the valve seat of forge sintering and the valve seat of infiltrated sintering.
Figure 45:
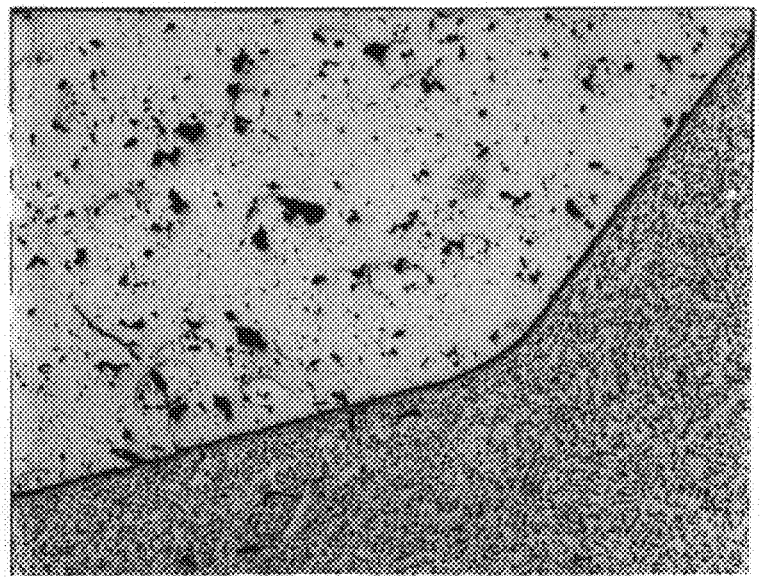
FIG. 45 is a microphotograph showing the section of the valve seat made of forge sintering and the test piece being joined.
Figure 46:
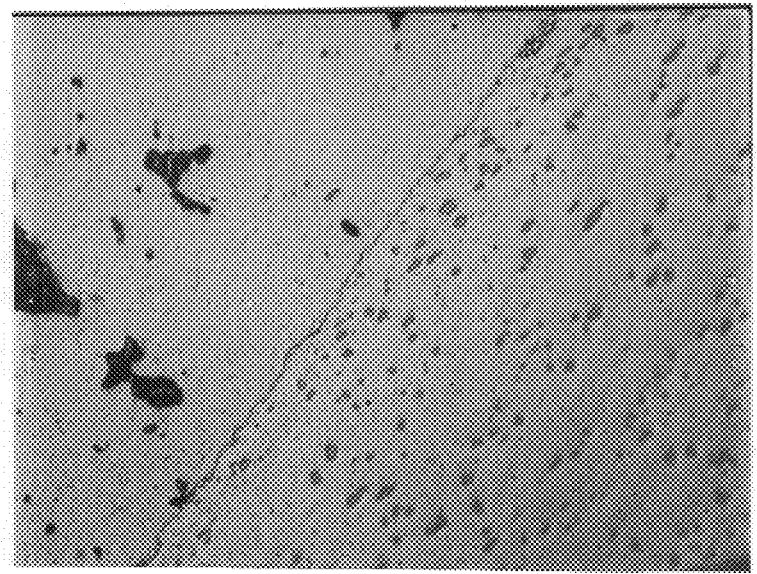
FIG. 46 is a microphotograph showing the state of the valve seat made of forge sintering and the test piece being joined, in a further enlarged view.

Results of the measurements are shown in FIG. 44. It can be seen that hardness inside the test piece 61 is lower in the case of the infiltrated sintering. This is because infiltration with the Cu-based material restricted the heat generation in the valve seat with effective heat generation in the joined surface, thus causing the test piece 61 to soften. But the valve seat made of forge sintering was also joined satisfactorily. This is also shown in a microphotograph (at power of 50 in FIG. 45 and in FIG. 46, power of 400) of the joining surfaces of the valve seat and the test piece 61. This is because the pores in the valve seat were crushed by forging, thus giving the same effect as infiltration.

Now an example corresponding to the embodiment described above will be described below. First, a valve seat was made by sintering an Fe-based powdery material with Cu dispersed uniformly therein (example 1). For comparison, a valve seat made of forge sintering (Comparison 1) and valve seats were made of a sintered material consisting only of an element of relatively low electrical conductivity infiltrated with a Cu-based material (Comparisons 2 to 4).

TABLE 3

Figure 48:
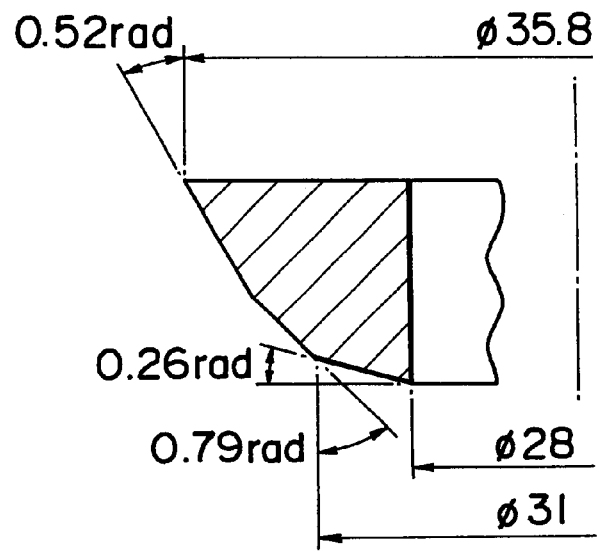
FIG. 48 is a sectional view showing the valve seat used in Example 2.
Figure 47:
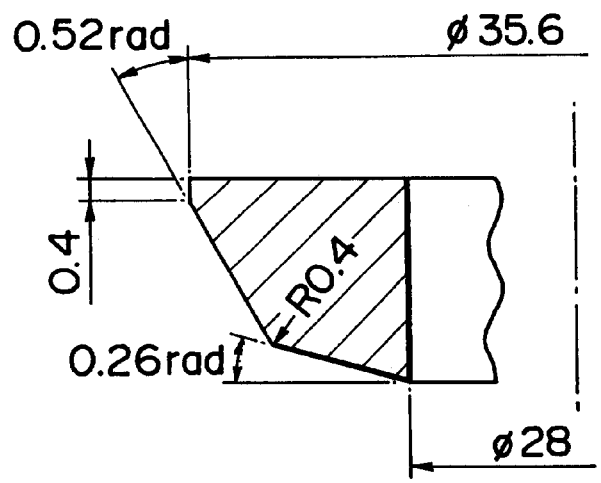
FIG. 47 is a sectional view showing the valve seat used in Example 1.

| | Composition (% by weight) | | | | | | | | | K | D |
|---|---|---|---|---|---|---|---|---|---|---|---|
| | TC | Ni | Cr | Mo | Co | W | Cu | Imp | Fe | W/m · K | g/cm$^3$ |
| Exam. 1 | 0.7–1.4 | — | 1.5–3.0 | 8.0–10. | — | — | 11.0–15.0 | ≦2.0 | Bal. | 34.7 | 6.9–7.6 |
| Comp 1 | 1.0–1.6 | 1.0–3.0 | 7.0–10.0 | 0.3–0.8 | 7.0–12. | 2.0–4.5 | — | ≦1.0 | Bal. | 28.0 | 7.1–7.7 |
| Comp 2 | 0.9–1.5 | — | — | 0.4–0.8 | — | — | 8.0–16.0 | ≦1.0 | Bal. | 46.0 | 7.5–8.1 |
| Comp 3 | 0.9–1.5 | 1.0–3.0 | 2.5–4.5 | 0.3–0.8 | 0.5–3.5 | 0.3–1.8 | 11.–18. | ≦1.0 | Bal. | 44.0 | 7.4–8.0 |
| Comp 4 | 1.0–1.6 | 1.0–3.0 | 5.5–8.0 | 0.3–0.8 | 5.0–8.0 | 1.5–3.0 | 11.–18. | ≦1.0 | Bal. | 39.8 | 7.4–8.0 | k; thermal conductivity, D; density,

Compositions of Example and Comparisons 1 to 4 are shown in Table 3. Cu contents in Comparisons 2 to 4 are values after infiltrating with the Cu-based material similarly to those shown in Table 2, and Cu is not included at all before infiltration. Cu content in the example is set to a level comparable to Cu content in Comparisons 2 to 4 after infiltration.

the valve seat of Example 1 and Comparisons 2 to 4 is shown in FIG. 47. A valve seat made of a sintered material of the same components, with only the shape being different, as Example 1 was made (Example 2). The shape of Example 2 is shown in FIG. 48. The valve seat of Example 2 has the third joining surface between the first joining surface and the second joining surface, similarly to those shown in FIGS. 25 and 26.

Figure 49:
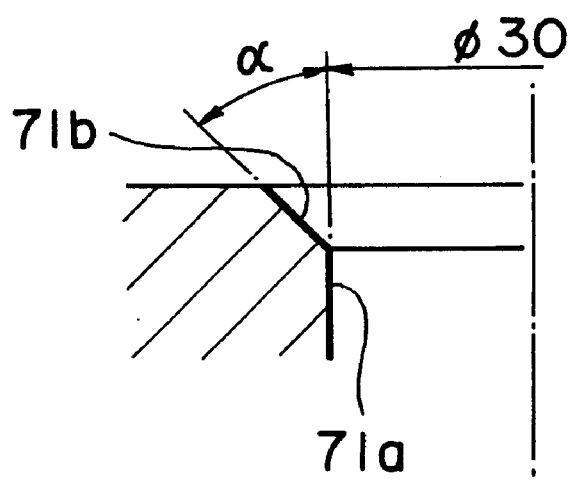
FIG. 49 is a partially sectional view showing a corner of the opening of the test piece used in joining in the example.

On the other hand, a test piece 71 shown in FIG. 49 was made of the same material as the test piece 61. The test piece 71 has a chamfered portion 71b at the top of a through hole 71a, similarly to the test piece 61. The chamfered portion 71b serves as joining surface before joining with the valve seat. Four values of about 0.52 rad (30°), about 0.79 rad (45°), about 1.04 rad (60°) and about 1.31 rad (75°) were set for the taper angle α with the chambered portion 71b.

Thermal conductivity and density of Example 1 and Comparisons 2 to 4 were measured. The measurements are shown in Table 3. It can be seen that Example 1 has lower density than Comparisons 2 to 4, indicating the presence of pores. Thermal conductivity of Example 1 was higher than that of Comparison 1, but lower than those of the infiltrated materials of Comparisons 2 to 4 due to effect of heat insulation of the pores.

Figure 50:
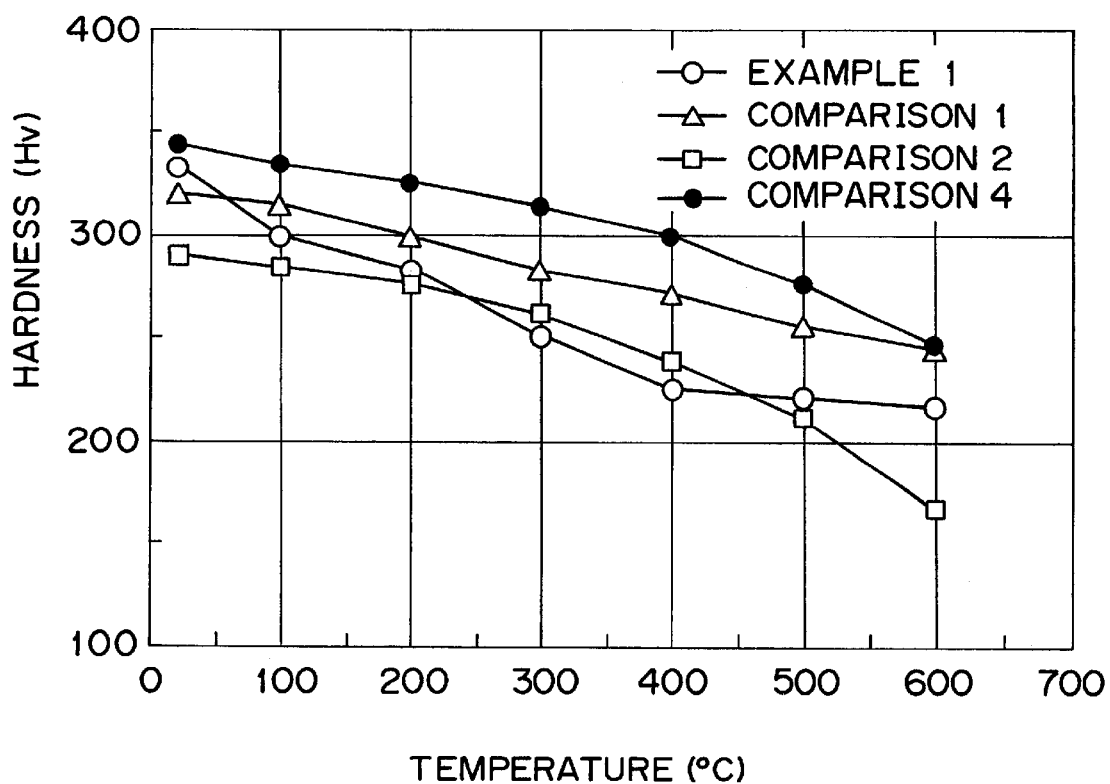
FIG. 50 is a graph showing the relationship between temperature and hardness in the valve seats of Example 1 and Comparison 1, 2 and 4.

Change in hardness with temperature was investigated on Example 1 and Comparisons 1, 2 and 4. Results of the hardness measuring test are shown in FIG. 50. It can be seen that hardness of the valve seat of Example 1 is slightly lower than that of the forge sintering of Comparison 1 and the infiltrated materials of Comparisons 2 to 4, and is therefore more easily deformed by the pressure when joining.

Valve seats of Example 1 and Comparisons 1 to 4 were joined to the test pieces 71 of taper angle α of about 0.79 rad (45°). Current and pressure were applied to the valve seat and the test piece 71 which has been put in linear contact with each other. Knock-off load was measured on the joined assemblies.

Figure 51:
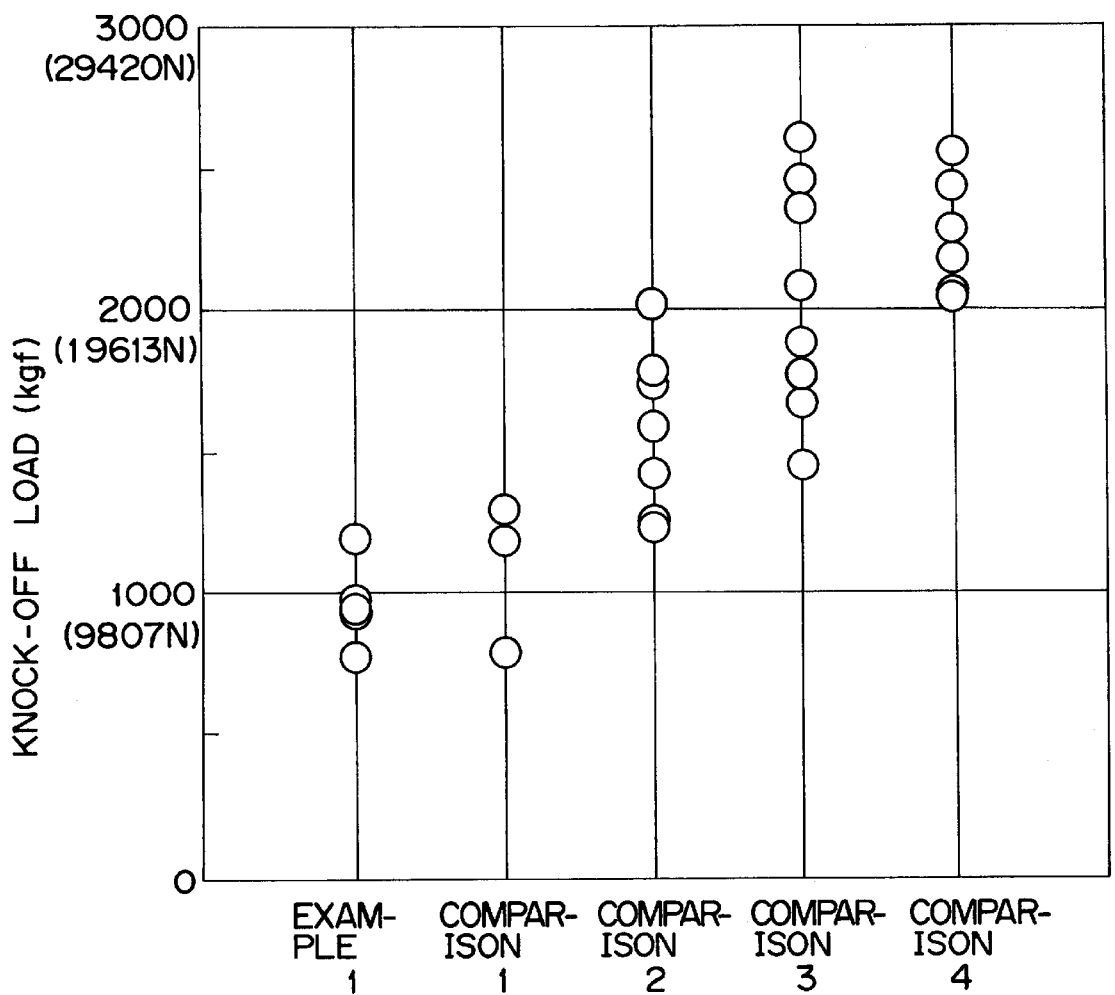
FIG. 51 is a graph showing the results of the knock-off load measuring test conducted on the valve seats of Example 1 and Comparison 1 to 4.
Figure 52:
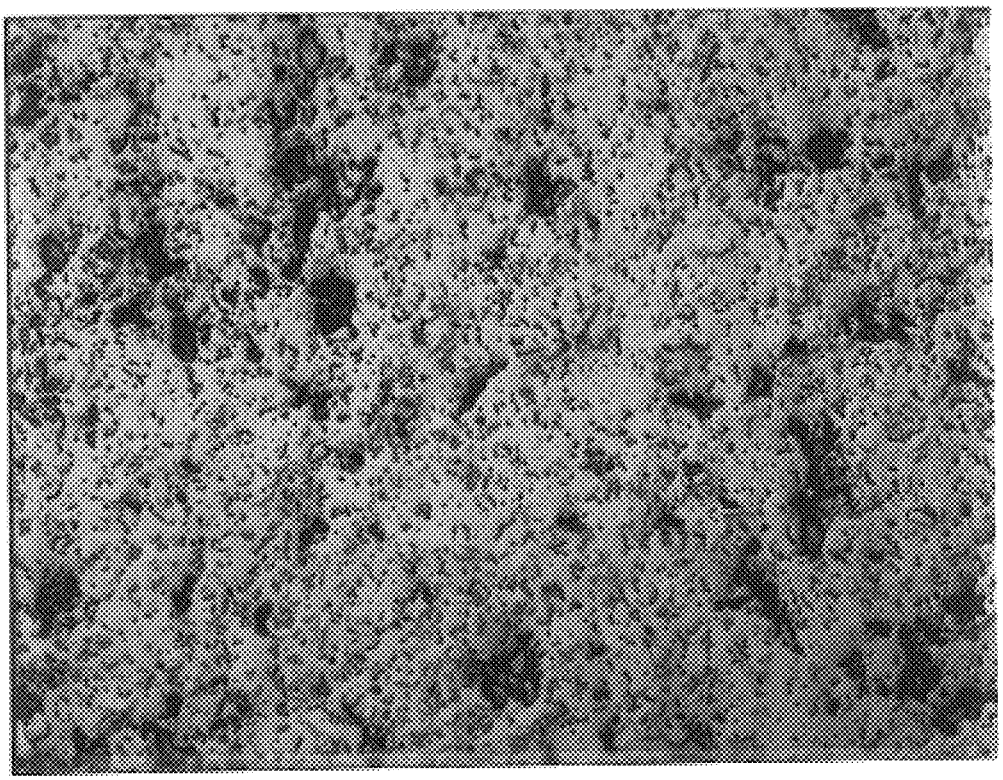
FIG. 52 is a microphotograph showing the section of the valve seat after joined in Example 1.

Results of the knock-off load measuring tests are shown in FIG. 51. It can be seen that joining strength of Example 1 is lower than that of the infiltrated material of Comparisons 2 to 4, but maintains a level comparable to that of the forge sintering of Comparison 1.

A microphotograph (power of about 50) of the inside of the valve seat of Example 1 after joining. It is shown that pores remain after joining and continue to provide heat insulation effect, thus making the heat dissipation slower than that of the infiltrated material.

Then the effect of applying current and pressure to the members which have been brought into surface contact in advance was investigated. Valve seat of Example 1 was joined to the test piece 71 of taper angle α of about 0.52 rad (30°). The first joining surface of the valve seat and the joining surface 71a of the test piece 71 were brought into surface contact (contact area of 40 to 200 mm²) in advance. Valve seat of Example 2 was joined to the test piece 71 of taper angle α of about 1.04 rad (60°). The valve seat and the joining surface 71a of the test piece 71 were brought into linear contact in advance. Further, the valve seat of Example 2 was joined to the test piece 71 of taper angle a of about 1.31 rad (75°). The second joining surface of the valve seat and the joining surface 71a of the test piece 71 were brought into surface contact (contact area of 40 to 200 mm²) in advance.

Figure 53:
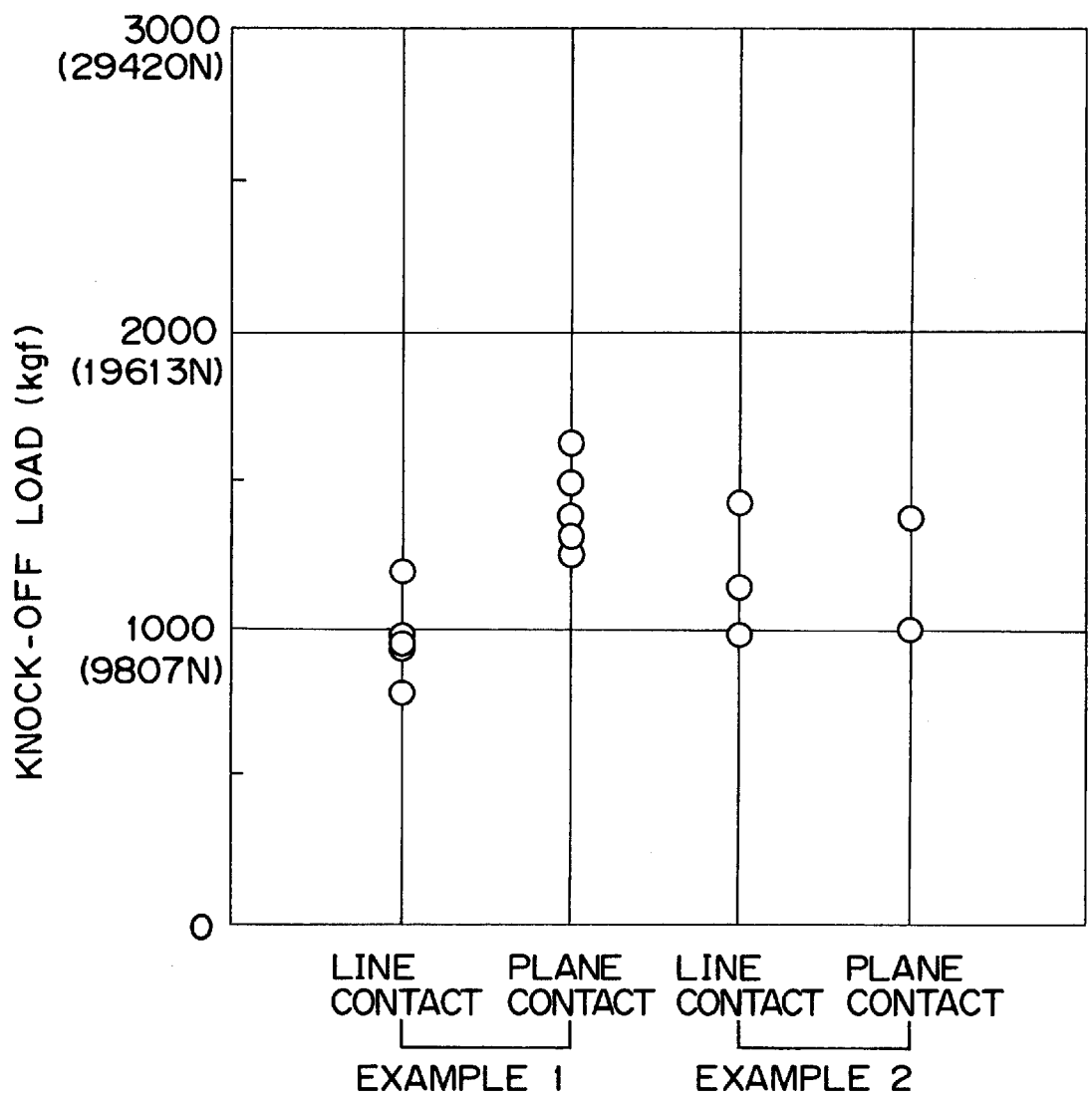
FIG. 53 is a graph showing the results of the knock-off load measuring test in the case of linear contact and the case of surface contact in Examples 1 and 2.
Figure 54:
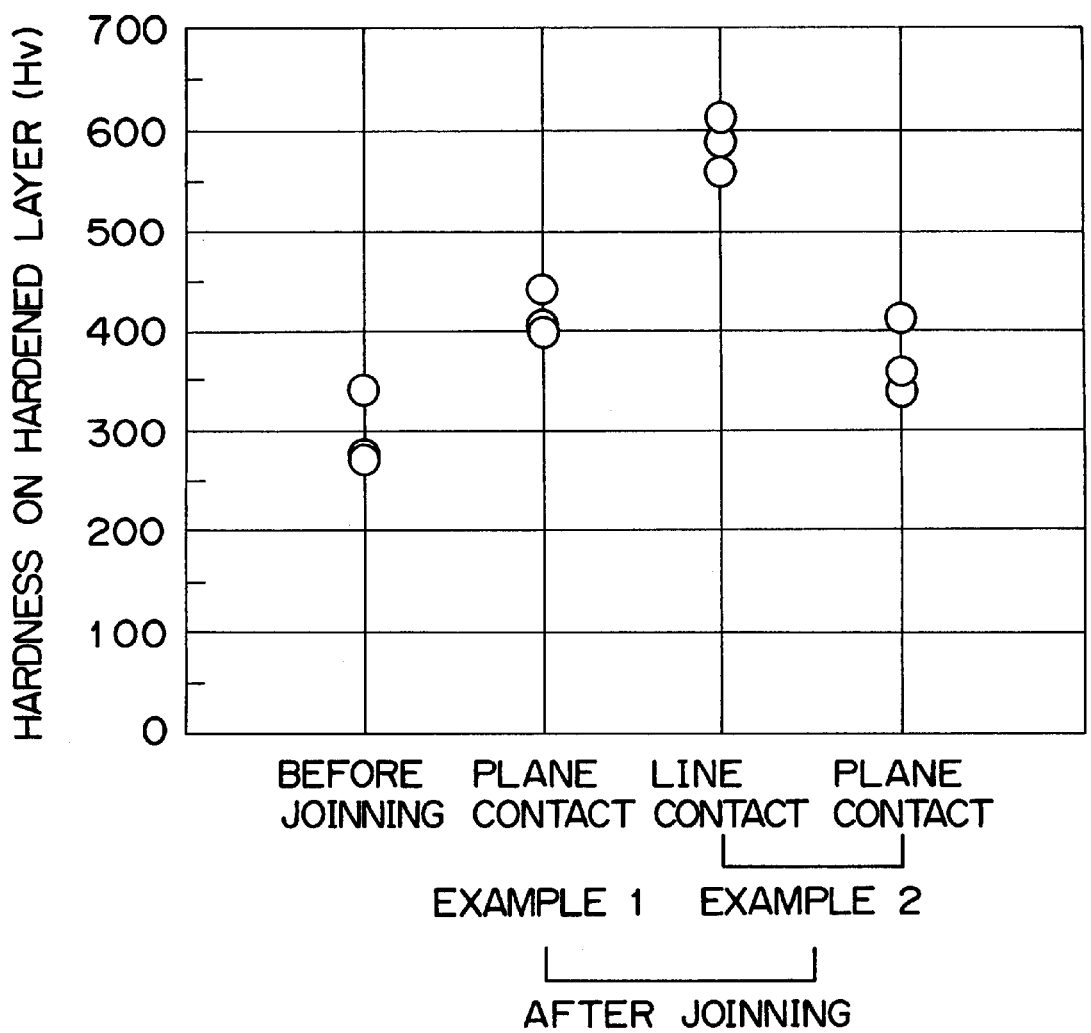
FIG. 54 is a graph showing the results of the hardness measuring test conducted on the valve seats in the case of linear contact and the case of surface contact in Examples 1 and 2.
Figure 55:
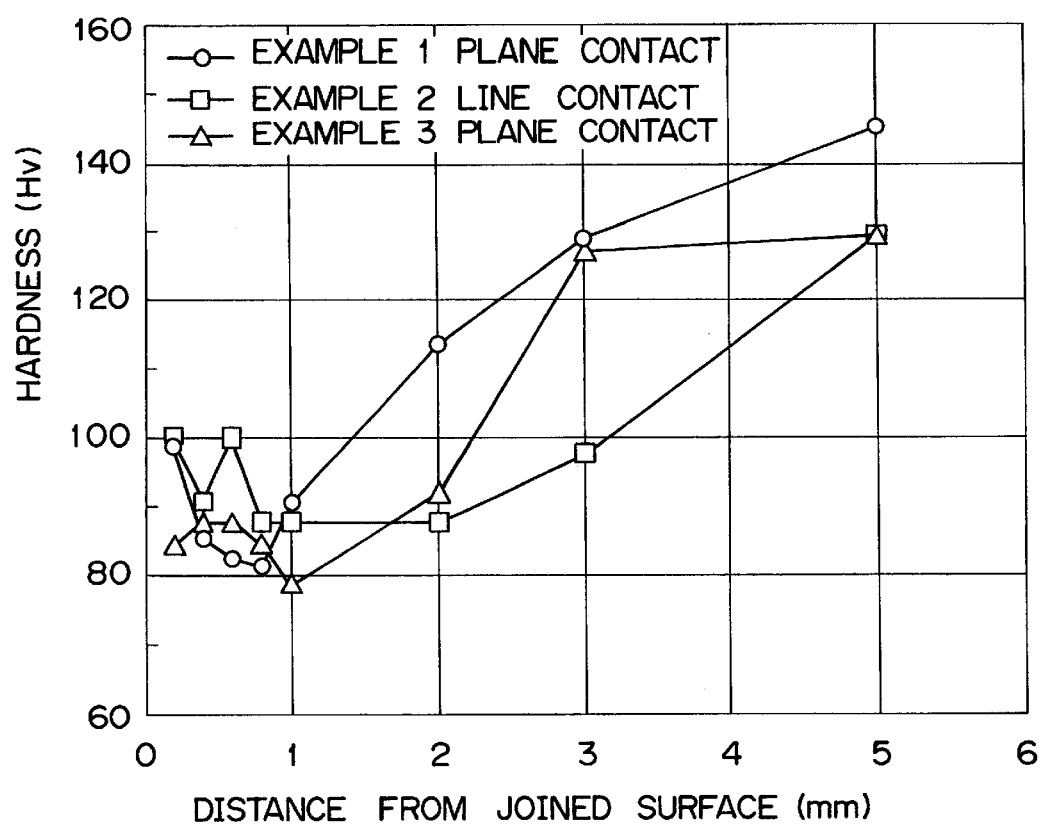
FIG. 55 is a graph showing the change in hardness with the distance from the joined surface of the test piece in the case of linear contact and the case of surface contact in Examples 1 and 2.

On the joined assemblies described above, knock-off load and hardness at middle portion in the vertical direction (hardened layer) of the valve seats after joining were measured. Also hardness was measured at predetermined intervals in a direction inclined by about 0.79 rad (45°) toward the side opposite to the place where the valve seat is joined, from the corner (center of the third joining surface in the case of Example 2) between the first joining surface and the second joining surface of the valve seat toward the periphery of the test piece 71. Results of the knock-off load test are shown in FIG. 53 (together with the measurement in the case of linear contact of Example 1 which was made beforehand). Measurements of hardness of the valve seat are shown in FIG. 54, and measurements of hardness on the test piece 71 are shown in FIG. 55. It can be seen that applying current and pressure to the members which have been brought into linear contact with each other causes excessive heat to be generated in the joined surface, with part of the heat being transmitted to the inside of the test piece 71 thereby to soften the test piece 71, with the rest of the heat being transmitted to the inside of the valve seat thus leading to increased hardness of the inside of the valve seat due to rapid cooling when the current is shut down. When current and pressure are applied after bringing the members into surface contact, on the other hand, heat generation in the joined surface and increase of hardness are inhibited, while improving the joining strength.

Figure 56:
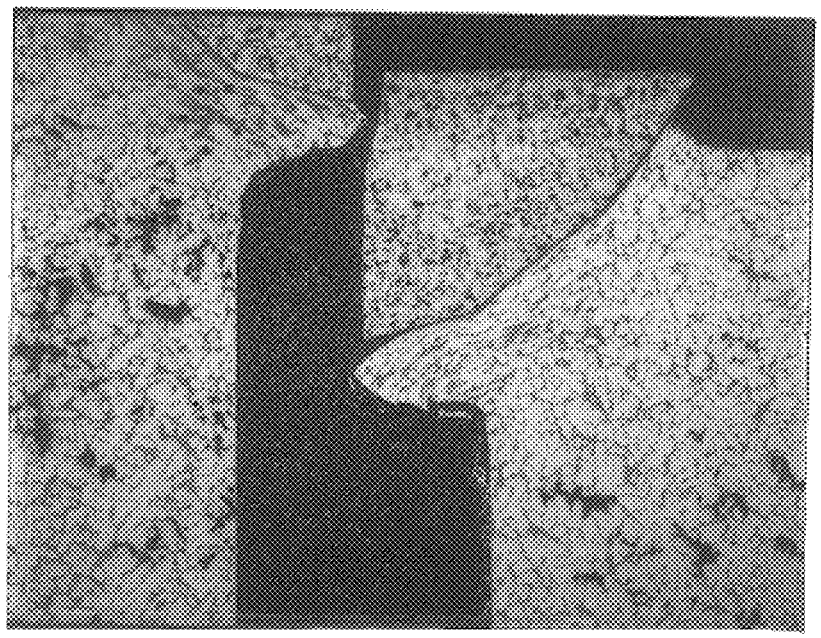
FIG. 56 is a microphotograph showing the state of joining the valve seat and the test piece which have been brought into surface contact in Example 2.
Figure 57:
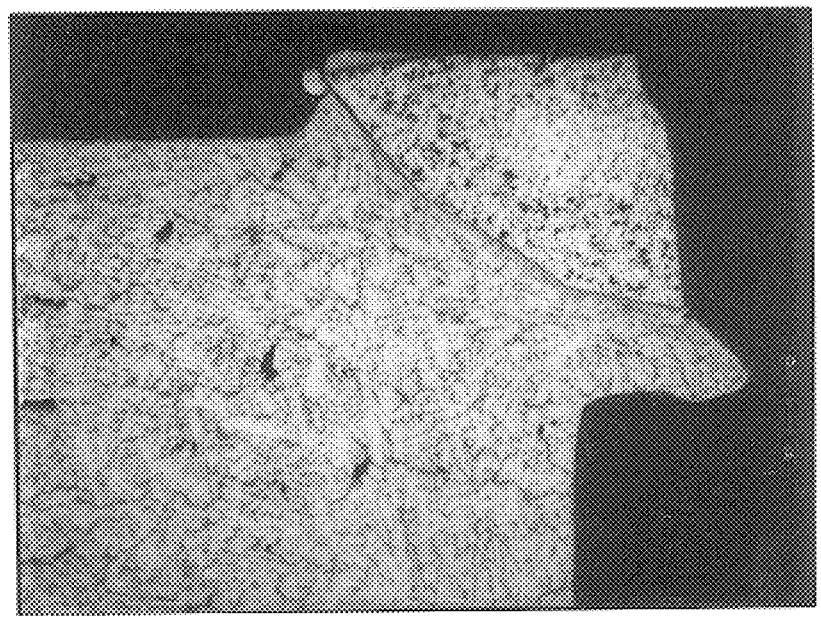
FIG. 57 is a microphotograph showing the sectional state of joining the valve seat and the test piece which have been brought into linear contact in Example 2.
Figure 58:
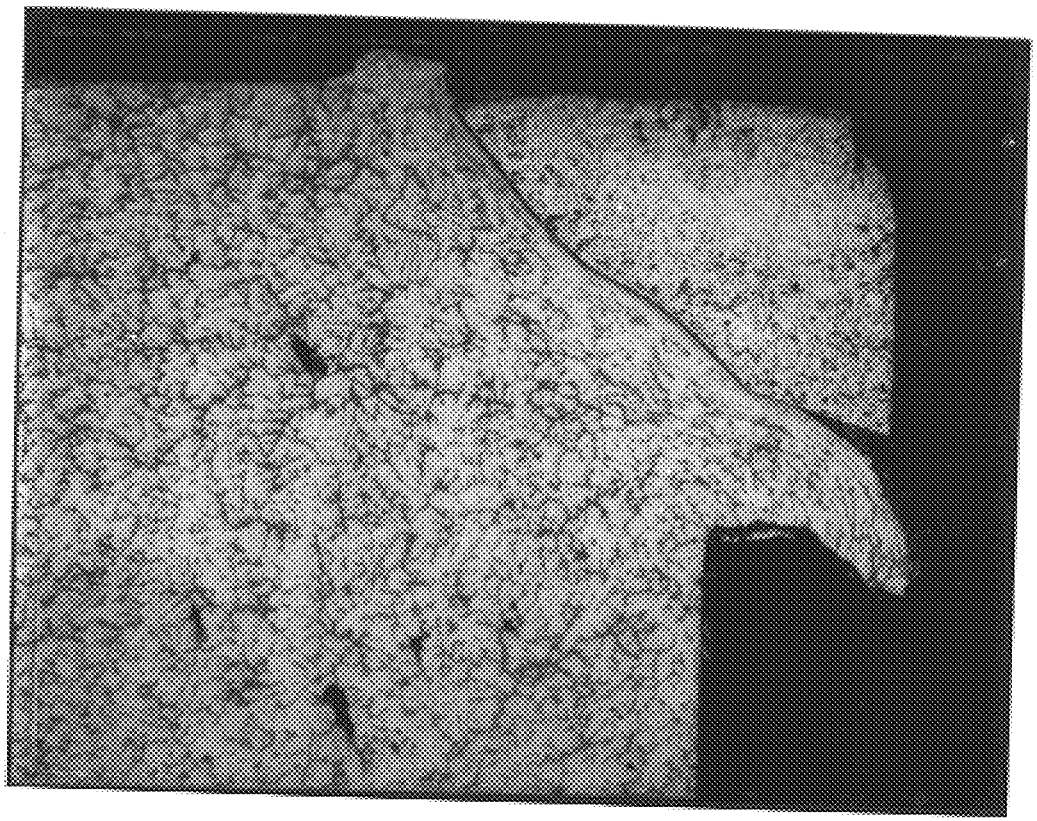
FIG. 58 is a microphotograph showing the state of joining the valve seat and the test piece without chamfered portion which have been brought into linear contact in Example 2.

In order to investigate the deformation of the valve seat after joining in the case of surface contact in Example 2, a joined assembly was cut along a vertical plane with the cut surface observed with a microscope, as shown in the microphotograph of FIG. 56. For comparison, a microphotograph of a cross section after joining with linear contact in Example 2 is shown in FIG. 57. Further, microphotograph of a cross section after joining the valve seat of Example 2 to the test piece 71 without chamfered portion 71b (the through hole 71a has the same diameter up to the top surface) is shown in FIG. 58 (also a case of bringing the members into linear contact in advance). These microphotographs were all taken with power of 10. It can be seen that linear contact leads to significant deformation of the third joining surface of the valve seat toward the inside, while surface contact results in restricted heat generation in the joining surface and therefore lead to almost no deformation in the joining surface of the valve surface despite the higher tendency to deform than the infiltrated material. These photographs also show that the inner circumferential surfaces of the valve seats are deformed inwardly. However, since the valve seats were positioned as in the embodiment, positioning could be done satisfactorily without causing cracks in the valve seats or damage to the upper electrode.

What is claimed is:

1. A method of joining two metal members by pressing and heating on passing an electric current through the metal members, said metal members having joining surfaces which are pressed together for joining the metal members, wherein the first member is a sintered material formed by sintering a powdery material containing particles having high electric conductivity dispersed therein, including a single process of pressing and heating the first and second metal members with a brazing material interposed therebetween, which process includes the steps of:

melting and brazing material between the first and second metal members by passing an electric current across both the metal members at a higher temperature than the melting point of the brazing material;

pressing the joining surfaces toward each other for substantially completely squeezing residual molten braze material from between the joining surfaces of the first and second metal members; and joining the first and second metal members by direct contact of diffusion layers formed on the joining surfaces of the metal members.

2. The method according to claim 1, wherein the particles having high electrical conductivity are copper particles.

3. The method according to claim 1, wherein the two metal members being put into surface contact with each other in advance are supplied with the current and at the same time pressurized.

4. The method according to claim 1, wherein the first metal member has higher electric conductivity in a portion on the opposite side to the second metal member than in the other portion on the side near the second metal member.

5. A method of joining two metal members by pressing and heating on passing an electric current through the metal members, comprising a process of:

forming a layer of a brazing material on a joining surface of the first metal member through a diffusion layer formed on the first metal member and the brazing material, said brazing material having a eutectic composition containing a main component of the second metal member and having a lower melting point than both said two metal members, and another single process of pressing and heating the first and second metal members with the brazing material imposed therebetween, which process includes the steps of:

pressing the first and second metal members into contact with each other with the layer of the brazing material on the joining surface of the first metal member in contact with the joining surface of the second metal member;

passing an electric current through both metal members for melting said brazing material at a temperature higher than the melting point of the brazing material;

forming a diffusion layer of the brazing material on the joining surface of the second metal member;

substantially completely squeezing residual molten brazing material from between the surfaces of the first and second metal members;

joining directly the diffusion layers on the metal members to each other; and terminating the flow of the electric current, whereby the metal members cool.

6. The method according to claim 5, wherein the first metal member is formed of a Fe-based material, the second metal member is formed of an Al-based material, and the brazing material is a Zn-based material.

7. The method according to claim 5 or 6, wherein the brazing material is made of a Zn—Al eutectic alloy.

8. The method according to claim 5, wherein in the step of forming the brazing material layer, ultrasonic vibration is applied to the surface of the first metal member immersed in a brazing material bath to coat the surface with a brazing material layer.

9. The method according to claim 5, wherein joint of the first metal member with the second metal member is carried out by plastically deforming the joining surface of the second metal member under pressure.

* * * * *